(12) United States Patent
Murray et al.

(10) Patent No.: US 8,207,280 B2
(45) Date of Patent: Jun. 26, 2012

(54) USE OF HYDROGEN SCAVENGING CATALYSTS TO CONTROL POLYMER MOLECULAR WEIGHT AND HYDROGEN LEVELS IN A POLYMERIZATION REACTOR

(75) Inventors: Rex E. Murray, Peoria, IL (US); William B. Beaulieu, Tulsa, OK (US); Qing Yang, Bartlesville, OK (US); Errun Ding, Bartlesville, OK (US); Gary L. Glass, Dewey, OK (US); Alan L. Solenberger, Bartlesville, OK (US); Steven J. Secora, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 86 days.

(21) Appl. No.: 12/824,491

(22) Filed: Jun. 28, 2010

(65) Prior Publication Data

US 2010/0331501 A1 Dec. 30, 2010

Related U.S. Application Data

(60) Provisional application No. 61/221,312, filed on Jun. 29, 2009.

(51) Int. Cl.
C08F 4/642 (2006.01)
C08F 4/643 (2006.01)
C08F 4/6592 (2006.01)
B01J 31/22 (2006.01)

(52) U.S. Cl. ........ 526/113; 526/114; 526/129; 526/134; 526/160; 526/165; 526/943; 502/113; 502/120; 502/128; 502/152

(58) Field of Classification Search .............. 526/113, 526/114, 129, 134, 160, 165, 943; 502/113, 502/120, 128, 152

See application file for complete search history.

(56) References Cited

U.S. PATENT DOCUMENTS

| | | | |
|---|---|---|---|
| 3,146,223 A | 8/1964 | Cheney | |
| 3,242,099 A | 3/1966 | Manyik | |
| 3,248,179 A | 4/1966 | Norwood | |
| 4,060,480 A | 11/1977 | Reed | |
| 4,200,714 A | 4/1980 | Mahoney et al. | |
| 4,452,910 A | 6/1984 | Hopkins | |
| 4,501,885 A | 2/1985 | Sherk et al. | |
| 4,530,914 A | 7/1985 | Ewen | |
| 4,588,790 A | 5/1986 | Jenking, III et al. | |
| 4,794,096 A | 12/1988 | Ewen | |
| 4,808,561 A | 2/1989 | Welborn | |
| 4,851,488 A | 7/1989 | Burstain | |
| 4,935,474 A | 6/1990 | Ewen | |
| 4,937,299 A | 6/1990 | Ewen | |
| 5,064,797 A | 11/1991 | Stricklen | |
| 5,091,352 A | 2/1992 | Kioka et al. | |
| 5,134,208 A | 7/1992 | Burstein | |
| 5,194,529 A | 3/1993 | McCullough | |
| 5,237,025 A | 8/1993 | Benham | |
| 5,276,115 A | 1/1994 | Bohmer | |
| 5,308,811 A | 5/1994 | Suga et al. | |
| 5,317,036 A | 5/1994 | Brady, III et al. | |
| 5,352,749 A | 10/1994 | DeChellis et al. | |
| 5,359,015 A | 10/1994 | Jejelowo | |
| 5,376,611 A | 12/1994 | Shveima | |
| 5,405,922 A | 4/1995 | DeChellis et al. | |
| 5,436,304 A | 7/1995 | Griffin et al. | |
| 5,455,314 A | 10/1995 | Burns et al. | |
| 5,464,905 A | 11/1995 | Tsutsui et al. | |
| 5,470,811 A | 11/1995 | Jejelowo et al. | |
| 5,498,581 A | 3/1996 | Welch et al. | |
| 5,516,848 A | 5/1996 | Canich et al. | |
| 5,527,752 A | 6/1996 | Reichle | |
| 5,527,867 A | 6/1996 | Bergmeister | |
| 5,565,175 A | 10/1996 | Hottovy et al. | |
| 5,575,979 A | 11/1996 | Hanson | |
| 5,576,259 A | 11/1996 | Hasegawa | |
| 5,594,078 A | 1/1997 | Welch et al. | |
| 5,595,953 A | 1/1997 | McDaniel et al. | |
| 5,648,439 A | 7/1997 | Bergmeister | |
| 5,672,666 A | 9/1997 | Muhle | |
| 5,693,727 A | 12/1997 | Goode | |
| 5,714,425 A | 2/1998 | Chabrand | |
| 5,739,220 A | 4/1998 | Shamshoum et al. | |
| 5,753,786 A | 5/1998 | Agapiou | |
| 5,762,666 A | 6/1998 | Amrein | |
| 5,807,938 A | 9/1998 | Kaneko | |
| 5,847,059 A | 12/1998 | Shamshoum et al. | |
| 5,916,982 A | 6/1999 | Nakazawa | |
| 5,919,983 A | 7/1999 | Rosen | |

(Continued)

FOREIGN PATENT DOCUMENTS

EP 0705851 4/1996

(Continued)

OTHER PUBLICATIONS

U.S. Appl. No. 12/898,465, filed Oct. 5, 2010 entitled "Oligomerization of Olefin Waxes Using Metallocene-Based Catalyst Systems".
Hawley's Condensed Chemical Dictionary, 11th Ed., John Wiley & Sons, 1995, 3 pages.
Cotton et al., Advanced Inorganic Chemistry, 6th Ed., Wiley-Interscience, 1999, 4 pages.
Pinnavaia, "Intercalated Clay Catalysts," Science, 1983, 220(4595), pp. 365-371.
Thomas, "Sheet Silicate Intercalates: New Agents for Unusual Chemical Conversions," Intercalation Chemistry (S. Whittington and A. Jacobson, eds.), Academic Press, Inc. Ch. 3, 1972, pp. 55-99.

(Continued)

Primary Examiner — Caixia Lu
(74) Attorney, Agent, or Firm — Merchant & Gould P.C.

(57) ABSTRACT

The present invention provides dual catalyst systems containing a metallocene catalyst and a hydrogen scavenging catalyst, and polymerization processes employing these dual catalyst systems. Due to a reduction in hydrogen levels in the polymerization processes, olefin polymers produced from these polymerization processes may have a higher molecular weight, a lower melt index, and higher levels of unsaturation.

18 Claims, 1 Drawing Sheet

U.S. PATENT DOCUMENTS

| | | | |
|---|---|---|---|
| 6,037,296 | A | 3/2000 | Hsieh |
| 6,103,657 | A | 8/2000 | Murray et al. |
| 6,107,230 | A | 8/2000 | McDaniel et al. |
| 6,156,854 | A | 12/2000 | Shamshoum et al. |
| 6,165,929 | A | 12/2000 | McDaniel et al. |
| 6,214,949 | B1 | 4/2001 | Reddy et al. |
| 6,239,235 | B1 | 5/2001 | Hottovy et al. |
| 6,258,903 | B1 | 7/2001 | Mawson et al. |
| 6,262,191 | B1 | 7/2001 | Hottovy et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |
| 6,355,594 | B1 | 3/2002 | McDaniel et al. |
| 6,376,415 | B1 | 4/2002 | McDaniel et al. |
| 6,388,017 | B1 | 5/2002 | McDaniel et al. |
| 6,391,816 | B1 | 5/2002 | McDaniel et al. |
| 6,395,666 | B1 | 5/2002 | McDaniel et al. |
| 6,524,987 | B1 | 2/2003 | Collins et al. |
| 6,548,441 | B1 | 4/2003 | McDaniel et al. |
| 6,548,442 | B1 | 4/2003 | Collins et al. |
| 6,576,583 | B1 | 6/2003 | McDaniel et al. |
| 6,613,712 | B1 | 9/2003 | McDaniel et al. |
| 6,632,894 | B1 | 10/2003 | McDaniel et al. |
| 6,667,274 | B1 | 12/2003 | Hawley et al. |
| 6,730,751 | B2 | 5/2004 | Shamshoum et al. |
| 6,750,302 | B1 | 6/2004 | McDaniel et al. |
| 6,833,415 | B2 | 12/2004 | Kendrick et al. |
| 7,119,153 | B2 | 10/2006 | Jensen et al. |
| 7,199,073 | B2 | 4/2007 | Martin |
| 7,226,886 | B2 | 6/2007 | Jayaratne et al. |
| 7,256,247 | B2 | 8/2007 | Shamshoum et al. |
| 7,312,283 | B2 | 12/2007 | Martin et al. |
| 7,456,243 | B2 | 11/2008 | Jensen et al. |
| 7,468,452 | B1 | 12/2008 | Martin et al. |
| 7,517,939 | B2 | 4/2009 | Yang et al. |
| 7,619,047 | B2 | 11/2009 | Yang et al. |
| 7,625,982 | B2 | 12/2009 | Martin et al. |
| 7,863,210 | B2 | 1/2011 | Murray et al. |
| 7,960,487 | B2 | 6/2011 | Yang et al. |
| 2004/0059070 | A1 | 3/2004 | Whitte et al. |
| 2005/0203261 | A1 | 9/2005 | Sukhadia et al. |
| 2007/0060722 | A1 | 3/2007 | Jayaratne et al. |
| 2009/0170690 | A1 | 7/2009 | Murray et al. |
| 2009/0170691 | A1 | 7/2009 | Murray et al. |
| 2009/0171041 | A1 | 7/2009 | Murray et al. |
| 2010/0076167 | A1 | 3/2010 | McDaniel et al. |
| 2010/0317904 | A1 | 12/2010 | Small |
| 2010/0324236 | A1 | 12/2010 | Murray et al. |
| 2010/0331501 | A1 | 12/2010 | Murray et al. |
| 2010/0331505 | A1 | 12/2010 | Masino et al. |
| 2011/0082323 | A1 | 4/2011 | Small et al. |

FOREIGN PATENT DOCUMENTS

| | | |
|---|---|---|
| EP | 0768319 | 4/1997 |
| EP | 0770629 | 5/1997 |
| EP | 0778293 | 6/1997 |
| EP | 2033977 | 3/2009 |
| WO | WO 96/00246 | 1/1996 |
| WO | WO 98/02247 | 1/1998 |
| WO | WO 2005/070977 | 8/2005 |
| WO | WO 2007/024773 | 3/2007 |
| WO | WO 2007/037836 | 4/2007 |

OTHER PUBLICATIONS

U.S. Appl. No. 12/824,363, filed Jun. 28, 2010, entitled "Dual Metallocene Catalyst Systems for Decreasing Melt Index and Increasing Polymer Production Rates," inventors: Masino et al.

U.S. Appl. No. 12/489,630, filed Jun. 23, 2009, entitled "Nano-Linked Heteronuclear Metallocene Catalyst Compositions and Their Polymer Products," inventors: Murray et al.

U.S. Appl. No. 61/221,312, filed Jun. 29, 2009, entitled "The Use of Hydrogenation Catalysts to Control Polymer Molecular Weight and Hydrogen Levels in a Polymerization Reactor," inventors: Murray et al.

U.S. Appl. No. 61/221,222, filed Jun. 29, 2009, entitled "Dual Metallocene Catalyst Systems for Decreasing Melt Index and Increasing Polymer Production Rates," inventors: Masino et al.

Wasserman et al., "Studies on Dihydrogen Generation by a Bridged Metallocene Polyethylene Catalyst," Polymer Preprints, 1998, pp. 425-426.

Li, et al., "Coordination Copolymerization of Severely Encumbered Isoalkenes with Ethylene: Enhanced Enchainment Mediated by Binuclear Catalysts and Cocatalysts," JACS Articles, 2005, 127, 14756-14768.

Search Report for International Application No. PCT/US2010/001843, mailed Sep. 1, 2010.

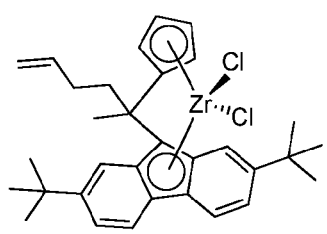
MET-I-A
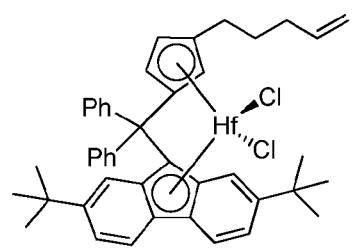
MET-I-B
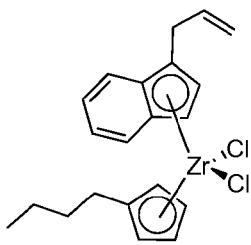
MET-II-A
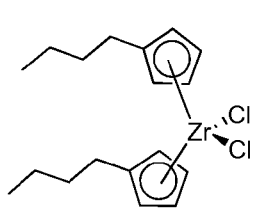
MET-II-B
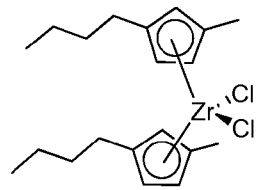
MET-II-C
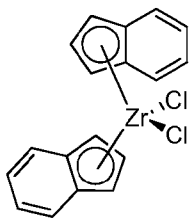
MET-II-D
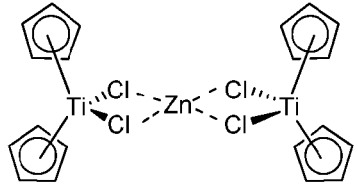
MET-II-E
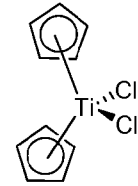
MET-II-F
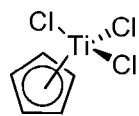
MET-II-G
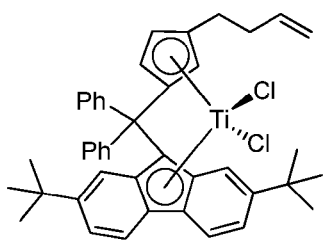
MET-II-H

USE OF HYDROGEN SCAVENGING CATALYSTS TO CONTROL POLYMER MOLECULAR WEIGHT AND HYDROGEN LEVELS IN A POLYMERIZATION REACTOR

REFERENCE TO RELATED APPLICATION

This application claims the benefit of U.S. Provisional Application Ser. No. 61/221,312, filed on Jun. 29, 2009, the disclosure of which is incorporated herein by reference in its entirety.

BACKGROUND OF THE INVENTION

The present invention relates generally to the field of olefin polymerization catalysis, metallocene catalyst compositions, methods for the polymerization and copolymerization of olefins, and polyolefins. With certain catalyst systems and polymerization processes, it can be difficult to produce a polyolefin having either a high molecular weight or a low melt index due to the presence of hydrogen in the polymerization reactor system. In such systems, hydrogen can reduce the molecular weight and increase the melt index of the polymer produced in the polymerization reactor.

Hence, it would be beneficial to produce polyolefins using a metallocene-based catalyst system, where the negative impact of hydrogen on the molecular weight of the polymer can be reduced or controlled. Accordingly, it is to this end that the present invention is directed.

SUMMARY OF THE INVENTION

The present invention discloses polymerization processes which employ dual catalyst systems for the production of polymers with higher molecular weights, with lower melt indices, and/or with higher levels of unsaturation. The processes disclosed herein can reduce and/or control the level or amount of hydrogen present during the polymerization process.

In accordance with one aspect of the present invention, a catalyst composition is provided. This catalyst composition comprises catalyst component I, catalyst component II, and an activator, wherein:

catalyst component I comprises a metallocene compound; and catalyst component II comprises a hydrogen scavenging catalyst.

Generally, the molar ratio of catalyst component I to catalyst component II in the catalyst composition can be in a range from about 40:1 to about 10,000:1, such as, for example, from about 50:1 to about 1000:1, from about 50:1 to about 500:1, or from about 100:1 to about 500:1.

In accordance with another aspect of the present invention, an olefin polymerization process is provided. This process comprises contacting a catalyst composition with an olefin monomer and optionally an olefin comonomer under polymerization conditions to produce an olefin polymer, wherein the catalyst composition comprises catalyst component I, catalyst component II, and an activator; wherein:

catalyst component I comprises a metallocene compound; and catalyst component II comprises a hydrogen scavenging catalyst.

Polymers produced from the polymerization of olefins using these catalyst systems, resulting in homopolymers, copolymers, and the like, can be used to produce various articles of manufacture.

BRIEF DESCRIPTION OF THE FIGURE

FIG. 1 presents the structures and abbreviations for certain metallocene compounds discussed herein.

DEFINITIONS

To define more clearly the terms used herein, the following definitions are provided. To the extent that any definition or usage provided by any document incorporated herein by reference conflicts with the definition or usage provided herein, the definition or usage provided herein controls.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer would be categorized an as ethylene/1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene) to produce a copolymer.

Hydrogen in this disclosure can refer to either hydrogen ($H_2$) which is used in a polymerization process, or a hydrogen atom (H), which can be present on the metallocene compounds disclosed herein. When used to denote a hydrogen atom, hydrogen will be displayed as "H," whereas if the intent is to disclose the use of hydrogen in a polymerization process, it will simply be referred to as "hydrogen."

The term "co-catalyst" is used generally herein to refer to organoaluminum compounds that can constitute one component of a catalyst composition. Additionally, "co-catalyst" can refer to other components of a catalyst composition including, but not limited to, aluminoxanes, organoboron or organoborate compounds, and ionizing ionic compounds, as disclosed herein, when used in addition to an activator-support. The term "co-catalyst" is used regardless of the actual function of the compound or any chemical mechanism by which the compound may operate. In one aspect of this invention, the term "co-catalyst" is used to distinguish that component of the catalyst composition from the metallocene compound(s).

The terms "chemically-treated solid oxide," "activator-support," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The terms "support" and "activator-support" are not used to imply these components are inert, and such components should not be construed as an inert component of the catalyst composition. The activator-support of the present invention can be a chemically-treated solid oxide. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+[BY_4]^-$, where Y represents a fluorinated organic group. Materials of these types are generally and collectively referred to as "organoboron or organoborate compounds."

The term "metallocene," as used herein, describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound. Metallocene is also used herein to encompass mono-cyclopentadienyl or half-sandwich compounds, as well as compounds containing at least one cyclodienyl ring and compounds containing boratabenzene ligands. Further, metallocene is also used herein to encompass dinuclear metallocene compounds, i.e., compounds comprising two metallocene moieties linked by a connecting group, such as an alkenyl group resulting from an olefin metathesis reaction or a saturated version resulting from hydrogenation or derivatization.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound and/or hydrogen scavenging catalyst, any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which may be blended, mixed, slurried, dissolved, reacted, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene compound and/or hydrogen scavenging catalyst (one or more than one), olefin monomer (or monomers), and organoaluminum compound (or compounds), before this mixture is contacted with an activator-support(s) and optional additional organoaluminum compound. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene compound and/or the hydrogen scavenging catalyst and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Additionally, the precontacted mixture can describe a mixture of metallocene compound(s) and/or hydrogen scavenging catalyst(s) and organoaluminum compound(s), prior to contacting this mixture with an activator-support(s). This precontacted mixture also can describe a mixture of metallocene compound(s) and/or hydrogen scavenging catalyst(s), olefin monomer(s), and activator-support(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound(s) and/or hydrogen scavenging catalyst(s), olefin monomer(s), organoaluminum compound(s), and activator-support(s) formed from contacting the precontacted mixture of a portion of these components with any additional components added to make up the postcontacted mixture. Often, the activator-support comprises a chemically-treated solid oxide. For instance, the additional component added to make up the postcontacted mixture can be a chemically-treated solid oxide (one or more than one), and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of weight ratios, a range of molar ratios, a range of temperatures, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language having from 1 to 18 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_6$ hydrocarbyl group), and also including any combination of ranges between these two numbers (for example, a $C_2$ to $C_4$ and $C_{10}$ to $C_{12}$ hydrocarbyl group).

Similarly, another representative example follows for the molar ratio of catalyst component I to catalyst component II in a catalyst composition provided in one aspect of this invention. By a disclosure that the molar ratio of catalyst component I to catalyst component II is in a range from about 50:1 to about 500:1, Applicants intend to recite that the molar ratio can be about 50:1, about 60:1, about 70:1, about 80:1, about 90:1, about 100:1, about 120:1, about 140:1, about 160:1, about 180:1, about 200:1, about 220:1, about 240:1, about 260:1, about 280:1, about 300:1, about 320:1, about 340:1, about 360:1, about 380:1, about 400:1, about 420:1, about 440:1, about 460:1, about 480:1, or about 500:1. Additionally, the molar ratio can be within any range from about 50:1 to about 500:1 (for example, the molar ratio is in a range from about 50:1 to about 200:1), and this also includes any combination of ranges between about 50:1 and about 500:1 (for example, the molar ratio is in a range from about 50:1 to about 150:1 or from about 250:1 to about 450:1). Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The terms "a," "an," "the," etc., are intended to include plural alternatives, e.g., at least one, unless otherwise specified. For instance, the disclosure of "an activator-support," "an organoaluminum compound," or "a metallocene compound" is meant to encompass one, or mixtures or combinations of more than one, activator-support, organoaluminum compound, or metallocene compound, respectively.

While compositions and methods are described in terms of "comprising" various components or steps, the compositions and methods can also "consist essentially of" or "consist of" the various components or steps. For example, a catalyst composition of the present invention can comprise; alternatively, can consist essentially of; or alternatively, can consist of; (i) catalyst component I, (ii) catalyst component II, (iii) an activator-support, and (iv) an organoaluminum compound.

DETAILED DESCRIPTION OF THE INVENTION

The present invention is directed generally to catalyst compositions, methods for preparing catalyst compositions, methods for using the catalyst compositions to polymerize olefins, the polymer resins produced using such catalyst compositions, and articles produced using these polymer resins. In one aspect, the present invention relates to a catalyst composition, said catalyst composition comprising catalyst component I, catalyst component II, and an activator (e.g., an activator-support and, optionally, an organoaluminum compound), wherein:

catalyst component I comprises a metallocene compound; and catalyst component II comprises a hydrogen scavenging catalyst.

In another aspect, an olefin polymerization process is provided and, in this aspect, the process comprises contacting a catalyst composition with an olefin monomer and optionally an olefin comonomer under polymerization conditions to produce an olefin polymer, wherein the catalyst composition comprises catalyst component I, catalyst component II, and an activator (e.g., an activator-support and, optionally, an organoaluminum compound), wherein:

catalyst component I comprises a metallocene compound; and catalyst component II comprises a hydrogen scavenging catalyst.

In these and other aspects, the molar ratio of catalyst component I to catalyst component II in the catalyst composition can be in a range from about 40:1 to about 10,000:1, or from about 50:1 to about 1000:1, or from about 100:1 to about 500:1.

Additionally, catalyst component II, comprising a hydrogen scavenging catalyst, can have a hydrogen removal activity of greater than about 5,000 moles of hydrogen ($H_2$) per mole of hydrogen scavenging catalyst per hour (i.e., the hydrogen scavenging catalyst can remove greater than about 5,000 moles of hydrogen from the polymerization process per hour, for each mole of the hydrogen scavenging catalyst present).

Catalyst Component I

A catalyst composition of the present invention comprises catalyst component I, which can comprise one or more metallocene compounds. Generally, there is no limitation on the selection of the metallocene compound, or compounds, that can be used in component I of the catalyst compositions and polymerization processes disclosed herein. Often, in a metallocene compound of catalyst component I, the transition metal is Ti, Zr, or Hf (or can be more than one, for example, if a dinuclear metallocene compound is employed).

In some aspects, catalyst component I can comprise a bridged metallocene compound having formula (C):

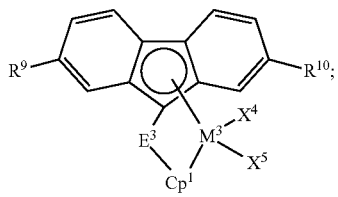

wherein:

$M^3$ is Zr or Hf;

$X^4$ and $X^5$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$E^3$ is a bridging group selected from:
 a cyclic or heterocyclic bridging group having up to 18 carbon atoms,
 a bridging group having the formula >$E^{3A}R^{7A}R^{8A}$, wherein $E^{3A}$ is C or Si, and $R^{7A}$ and $R^{8A}$ are independently H or a hydrocarbyl group having up to 18 carbon atoms,
 a bridging group having the formula —$CR^{7B}R^{8B}$—$CR^{7C}R^{8C}$, wherein $R^{7B}$, $R^{8B}$, $R^{7C}$, and $R^{8C}$ are independently H or a hydrocarbyl group having up to 10 carbon atoms, or
 a bridging group having the formula —$SiR^{7D}R^{8D}$—$SiR^{7E}R^{8E}$—, wherein $R^{7D}$, $R^{8D}$, $R^{7E}$, and $R^{8E}$ are independently H or a hydrocarbyl group having up to 10 carbon atoms;

$R^9$ and $R^{10}$ are independently H or a hydrocarbyl group having up to 18 carbon atoms; and $Cp^1$ is a cyclopentadienyl or indenyl group, any substituent on $Cp^1$ is H or a hydrocarbyl or hydrocarbylsilyl group having up to 18 carbon atoms.

Unless otherwise specified, formula (C) above, any other structural formulas disclosed herein, and any metallocene species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

Hydrocarbyl is used herein to specify a hydrocarbon radical group that includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, linear, and/or branched derivatives thereof. Unless otherwise specified, the hydrocarbyl groups of this invention typically comprise up to about 18 carbon atoms. In another aspect, hydrocarbyl groups can have up to 12 carbon atoms, for instance, up to 10 carbon atoms, up to 8 carbon atoms, or up to 6 carbon atoms. A hydrocarbyloxide group, therefore, is used generically to include both alkoxide and aryloxide groups, and these groups can comprise up to about 18 carbon atoms. Illustrative and non-limiting examples of alkoxide and aryloxide groups (i.e., hydrocarbyloxide groups) include methoxy, ethoxy, propoxy, butoxy, phenoxy, substituted phenoxy, and the like. The term hydrocarbylamino group is used generically to refer collectively to alkylamino, arylamino, dialkylamino, and diarylamino groups, and the like. Unless otherwise specified, the hydrocarbylamino groups of this invention comprise up to about 18 carbon atoms. Hydrocarbylsilyl groups include, but are not limited to, alkylsilyl groups, alkenylsilyl groups, arylsilyl groups, arylalkylsilyl groups, and the like, which have up to about 18 carbon atoms. For example, illustrative hydrocarbylsilyl groups can include trimethylsilyl and phenyloctylsilyl. These hydrocarbyloxide, hydrocarbylamino, and hydrocarbylsilyl groups can have up to 12 carbon atoms; alternatively, up to 10 carbon atoms; or alternatively, up to 8 carbon atoms, in other aspects of the present invention.

Unless otherwise specified, alkyl groups and alkenyl groups described herein are intended to include all structural isomers, linear or branched, of a given moiety; for example, all enantiomers and all diastereomers are included within this definition. As an example, unless otherwise specified, the term propyl is meant to include n-propyl and iso-propyl, while the term butyl is meant to include n-butyl, iso-butyl, t-butyl, sec-butyl, and so forth. For instance, non-limiting examples of octyl isomers include 2-ethyl hexyl and neooctyl. Suitable examples of alkyl groups which can be employed in the present invention include, but are not limited to, methyl, ethyl, propyl, butyl, pentyl, hexyl, heptyl, octyl, nonyl, decyl, and the like. Illustrative examples of alkenyl groups within the scope of the present invention include, but are not limited to, ethenyl, propenyl, butenyl, pentenyl, hexenyl, heptenyl, octenyl, nonenyl, decenyl, and the like. The alkenyl group can be a terminal alkenyl group, but this is not a requirement. For instance, specific alkenyl group substituents can include, but are not limited to, 3-butenyl, 4-pentenyl, 5-hexenyl, 6-heptenyl, 7-octenyl, 3-methyl-3-butenyl, 4-methyl-3-pentenyl, 1,1-dimethyl-3-butenyl, 1,1-dimethyl-4-pentenyl, and the like.

In this disclosure, aryl is meant to include aryl and aralkyl groups, and these include, but are not limited to, phenyl, alkyl-substituted phenyl, naphthyl, alkyl-substituted naphthyl, phenyl-substituted alkyl, naphthyl-substituted alkyl, and the like. Hence, non-limiting examples of such "aryl" moieties that can be used in the present invention include phenyl, tolyl, benzyl, dimethylphenyl, trimethylphenyl, phenylethyl, phenylpropyl, phenylbutyl, 2-propyl-phenylethyl, and the like. Unless otherwise specified, any substituted aryl moiety used herein is meant to include all regioisomers; for example, the term tolyl is meant to include any possible substituent position, that is, ortho, meta, or para.

In formula (C), $M^3$ is Zr or Hf. $X^4$ and $X^5$ independently can be F; Cl; Br; I; methyl; benzyl; phenyl; H; $BH_4$; $OBR_2$ or $SO_3R$, wherein R is an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms.

$X^4$ and $X^5$ independently can be F, Cl, Br, I, benzyl, phenyl, or methyl. For example, $X^4$ and $X^5$ independently are Cl, benzyl, phenyl, or methyl in one aspect of this invention. In another aspect, $X^4$ and $X^5$ independently are benzyl, phenyl, or methyl. Yet, in another aspect, both $X^4$ and $X^5$ can be Cl; alternatively, both $X^4$ and $X^5$ can be benzyl; alternatively, both $X^4$ and $X^5$ can be phenyl; or alternatively, both $X^4$ and $X^5$ can be methyl.

In formula (C), $E^3$ is a bridging group. In accordance with an aspect of this invention, $E^3$ can be a cyclic or heterocyclic bridging group having up to 18 carbon atoms, or alternatively, up to 12 carbon atoms. Cyclic groups include cycloalkyl and cycloalkenyl moieties and such moieties can include, but are not limited to, cyclopentyl, cyclopentenyl, cyclohexyl, cyclohexenyl, and the like. For instance, $E^3$ can be a cyclopentyl or cyclohexyl moiety. Heteroatom-substituted cyclic groups can be formed with nitrogen, oxygen, or sulfur heteroatoms. While these heterocyclic groups can have up to 12 or 18 carbons atoms, the heterocyclic groups can be 3-membered, 4-membered, 5-membered, 6-membered, or 7-membered groups in some aspects of this invention.

In accordance with another aspect of this invention, $E^3$ is a bridging group having the formula $>E^{3A}R^{7A}R^{8A}$, wherein $E^{3A}$ is C or Si, and $R^{7A}$ and $R^{8A}$ are independently H or a hydrocarbyl group having up to 18 carbon atoms or, alternatively, up to 12 carbon atoms. For instance, $R^{7A}$ and $R^{8A}$ independently can be H or an alkyl, alkenyl (e.g., a terminal alkenyl), or aryl group having up to 12 carbon atoms. Illustrative non-limiting examples of suitable "aryl" moieties for $R^{7A}$ and/or $R^{8A}$ include phenyl, tolyl, benzyl, dimethylphenyl, trimethylphenyl, phenylethyl, phenylpropyl, phenylbutyl, propyl-2-phenylethyl, and the like. In one aspect, $R^{7A}$ and $R^{8A}$ are independently H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl. In another aspect, $R^{7A}$ and $R^{8A}$ are the same, and are methyl, ethyl, propyl, butyl, pentyl, or phenyl. In yet another aspect, at least one of $R^{7A}$ and $R^{8A}$ is phenyl. In still another aspect, at least one of $R^{7A}$ and $R^{8A}$ is a terminal alkenyl group having up to 6 carbon atoms.

In accordance with another aspect of this invention, $E^3$ is a bridging group having the formula $—CR^{7B}R^{8B}—CR^{7C}R^{8C}—$, wherein $R^{7B}$, $R^{8B}$, $R^{7C}$, and $R^{8C}$ are independently H or a hydrocarbyl group having up to 10 carbon atoms or, alternatively, up to 6 carbon atoms. For instance, $R^{7B}$, $R^{8B}$, $R^{7C}$, and $R^{8C}$ independently can be H or an alkyl or an alkenyl group having up to 6 carbon atoms; alternatively, $R^{7B}$, $R^{8B}$, $R^{7C}$, and $R^{8C}$ independently can be H, methyl, ethyl, propyl, and $R^{8C}$ independently can be H, methyl, or ethyl; alternatively, $R^{7B}$, $R^{8B}$, $R^{7C}$, and $R^{8C}$ can be H; or alternatively, $R^{7B}$, $R^{8B}$, $R^{7C}$, and $R^{8C}$ can be methyl.

In accordance with another aspect of this invention, $E^3$ is a bridging group having the formula $—SiR^{7D}R^{8D}—SiR^{7E}R^{8E}—$, wherein $R^{7D}$, $R^{8D}$, $R^{7E}$, and $R^{8E}$ are independently H or a hydrocarbyl group having up to 10 carbon atoms or, alternatively, up to 6 carbon atoms. Accordingly, in aspects of this invention, $R^{7D}$, $R^{8D}$, $R^{7E}$, and $R^{8E}$ independently can be H or an alkyl or an alkenyl group having up to 6 carbon atoms; alternatively, $R^{7D}$, $R^{8D}$, $R^{7E}$, and $R^{8E}$ independently can be H, methyl, ethyl, propyl, butyl, allyl, butenyl, or pentenyl; alternatively, $R^{7D}$, $R^{8D}$, $R^{7E}$, and $R^{8E}$ independently can be H, methyl, or ethyl; alternatively, $R^{7D}$, $R^{8D}$, $R^{7E}$, and $R^{8E}$ can be H; or alternatively, $R^{7D}$, $R^{8D}$, $R^{7E}$, and $R^{8E}$ can be methyl.

$R^9$ and $R^{10}$ on the fluorenyl group in formula (C) are independently H or a hydrocarbyl group having up to 18 carbon atoms or, alternatively, having up to 12 carbon atoms. Accordingly, $R^9$ and $R^{10}$ independently can be H or a hydrocarbyl group having up to 8 carbon atoms, such as, for example, alkyl groups: methyl, ethyl, propyl, butyl, pentyl, or hexyl, and the like. In some aspects, $R^9$ and $R^{10}$ are independently methyl, ethyl, propyl, n-butyl, t-butyl, or hexyl, while in other aspects, $R^9$ and $R^{10}$ are independently H or t-butyl. For example, both $R^9$ and $R^{10}$ can be H or, alternatively, both $R^9$ and $R^{10}$ can be t-butyl.

In formula (C), $Cp^1$ is a cyclopentadienyl or indenyl. Often, $Cp^1$ is a cyclopentadienyl group. Any substituent on $Cp^1$ can be H or a hydrocarbyl or hydrocarbylsilyl group having up to 18 carbon atoms; or alternatively, any substituent can be H or a hydrocarbyl or hydrocarbylsilyl group having up to 12 carbon atoms. Possible substituents on $Cp^1$ may include H, therefore this invention comprises partially saturated ligands such as tetrahydroindenyl, partially saturated indenyl, and the like.

In one aspect, $Cp^1$ has no additional substitutions other than those shown in formula (C), e.g., no substituents other than the bridging group $E^3$. In another aspect, $Cp^1$ can have one or two substituents, and each substituent independently is H or an alkyl, alkenyl, alkylsilyl, or alkenylsilyl group having up to 8 carbon atoms, or alternatively, up to 6 carbon atoms. Yet, in another aspect, $Cp^1$ can have a single H, methyl ethyl, propyl, butyl, pentyl, hexyl, heptyl, octyl, ethenyl, propenyl, butenyl, pentenyl, hexenyl, heptenyl, or octenyl substituent.

In accordance with one aspect of this invention, $X^4$ and $X^5$ independently can be F, Cl, Br, I, benzyl, phenyl, or methyl, while $R^9$ and $R^{10}$ independently can be H or t-butyl, and $Cp^1$ either has no additional substituents or $Cp^1$ can have a single substituent selected from H or an alkyl, alkenyl, alkylsilyl, or alkenylsilyl group having up to 8 carbon atoms. In these and other aspects, $E^3$ can be cyclopentyl or cyclohexyl; alternatively, $E^3$ can be a bridging group having the formula $>E^{3A}R^{7A}R^{8A}$, wherein $E^{3A}$ is C or Si, and $R^{7A}$ and $R^{8A}$ are independently H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; alternatively, $E^3$ can be a bridging group having the formula $—CR^{7B}R^{8B}—CR^{7C}R^{8C}—$, wherein $R^{7B}$, $R^{8B}$, $R^{7C}$, and $R^{8C}$ are independently H or methyl; or alternatively, $E^3$ can be a bridging group having the formula $—SiR^{7D}R^{8D}—SiR^{7E}R^{8E}—$, wherein $R^{7D}$, $R^{8D}$, $R^{7E}$, and $R^{8E}$ are independently H or methyl.

Non-limiting examples of ansa-metallocene compounds having formula (C) that are suitable for use in catalyst component I include, but are not limited to, the following (Ph=phenyl; Me=methyl; and t-Bu=tert-butyl):

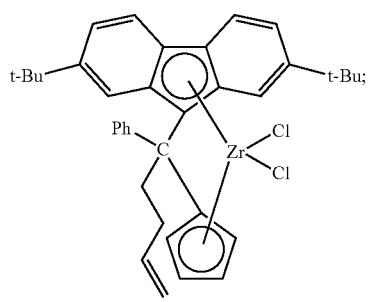
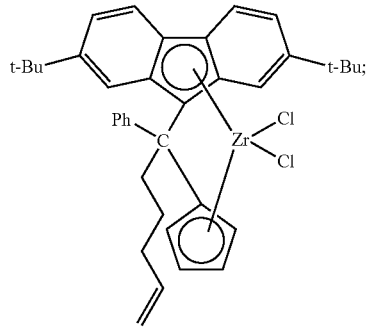
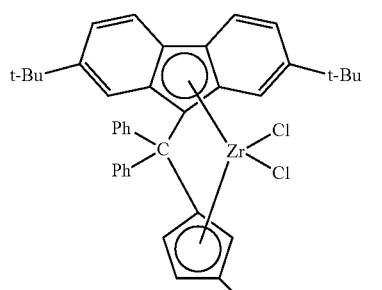
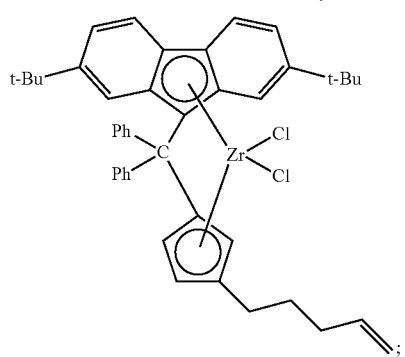
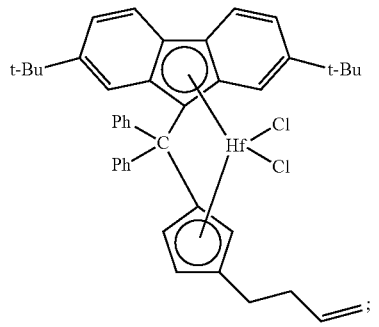
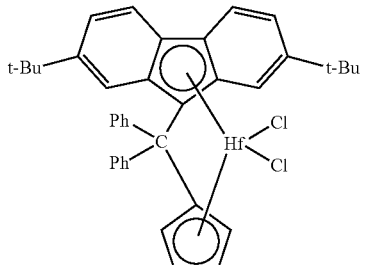
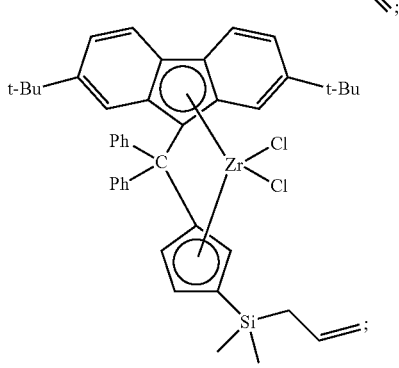
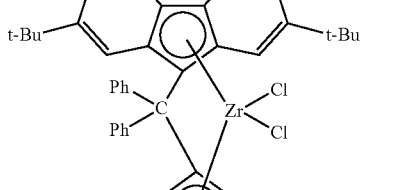
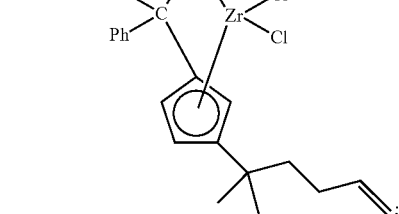
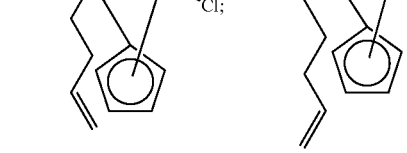

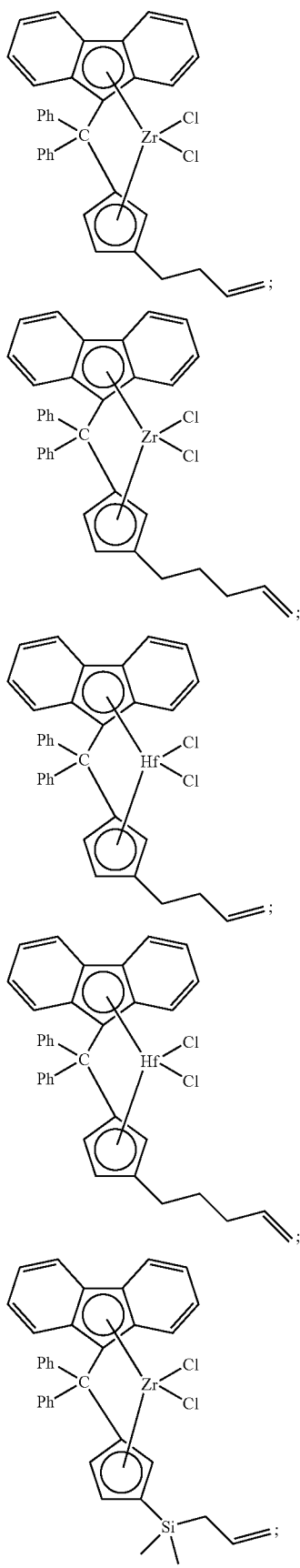

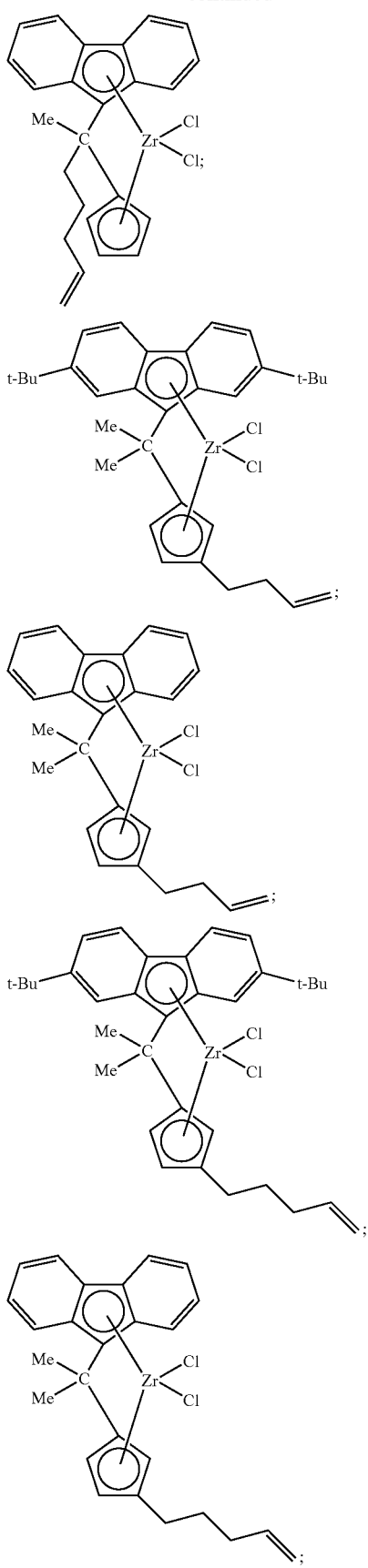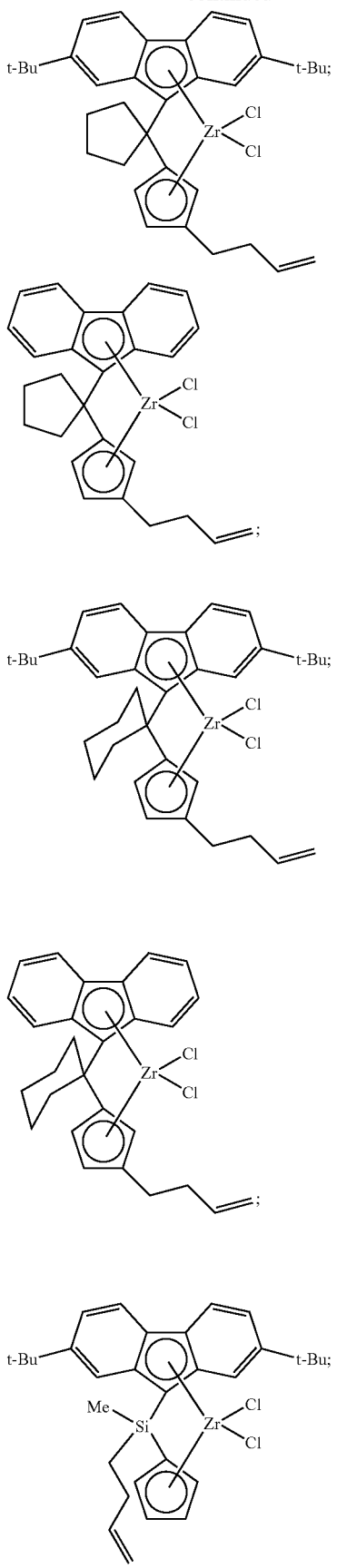

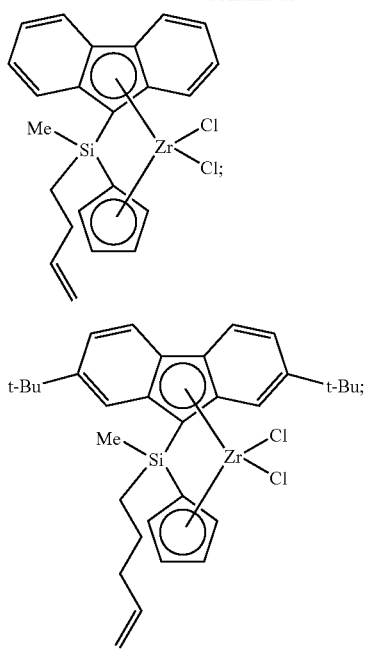
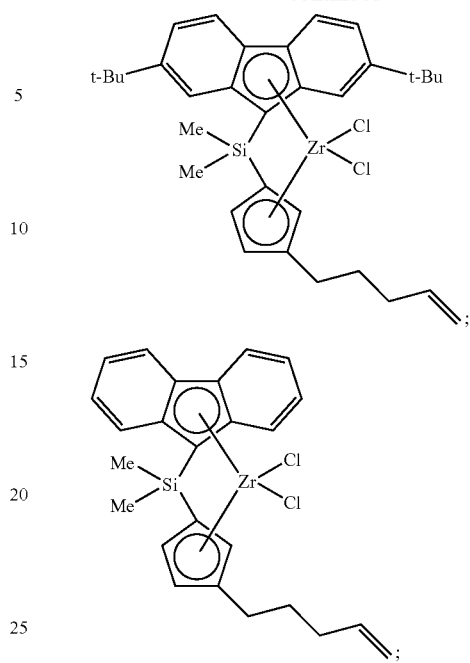
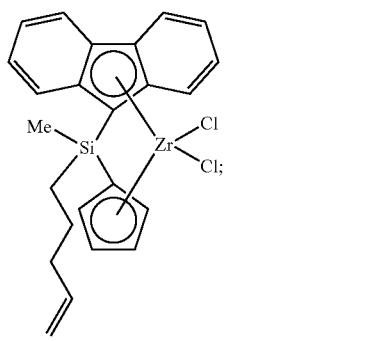
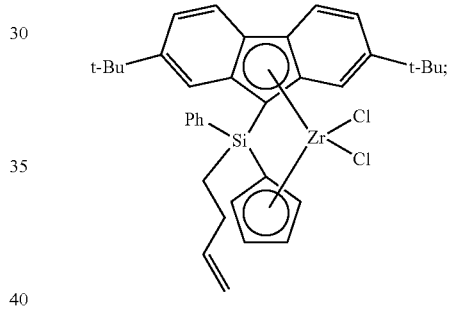
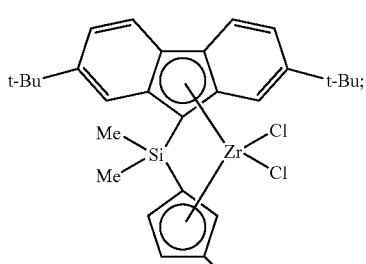
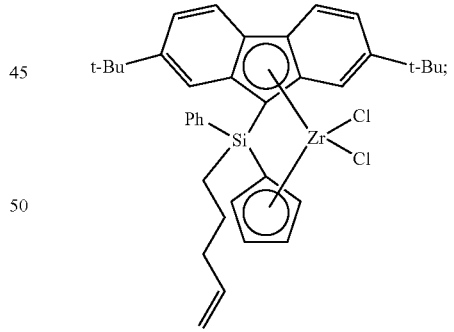
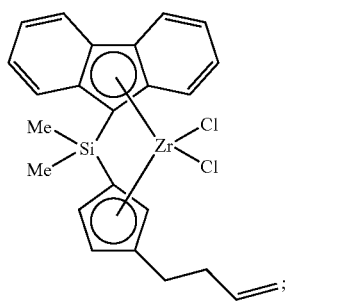
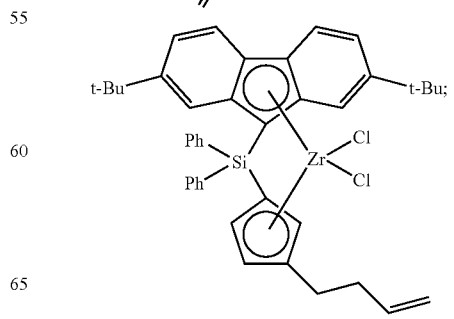

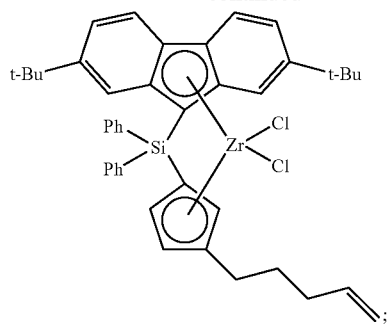
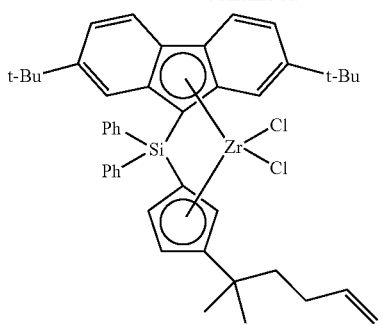
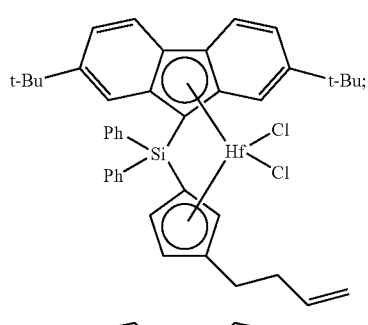
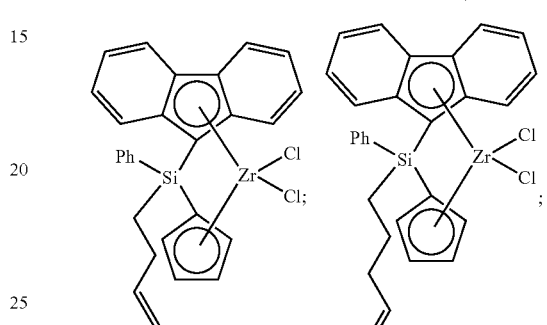
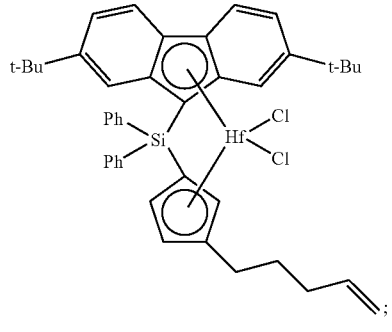
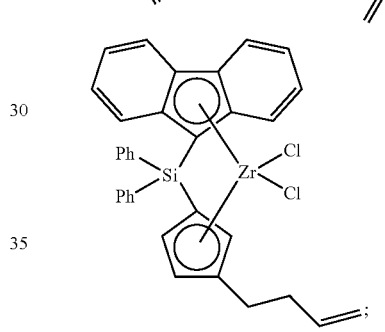
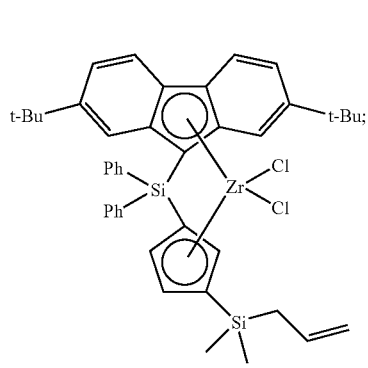
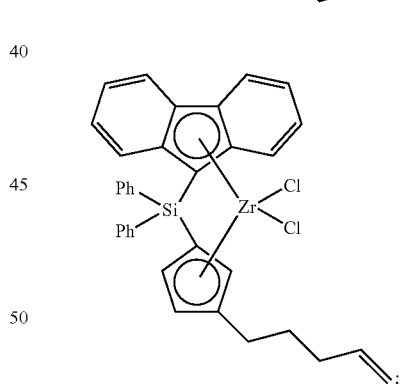
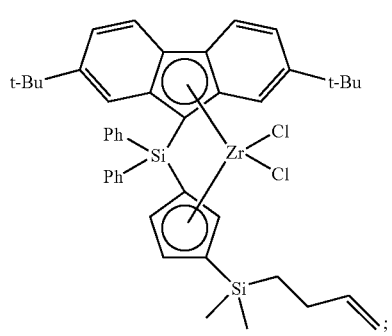
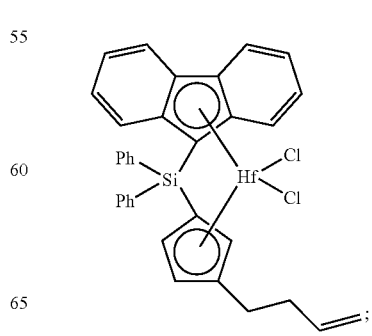

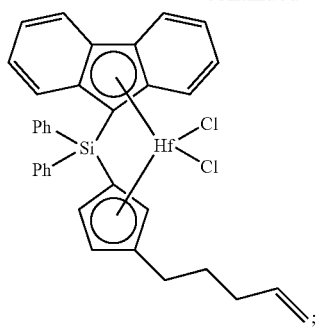
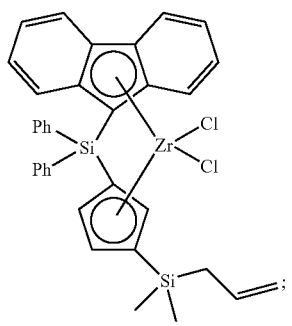
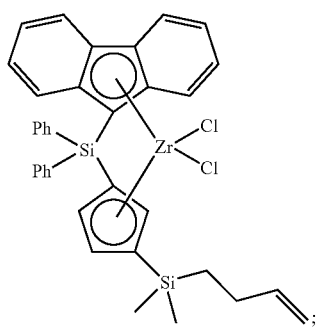
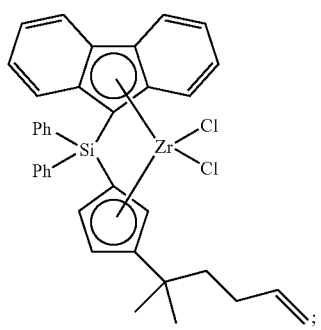
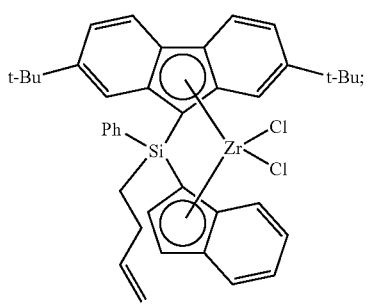
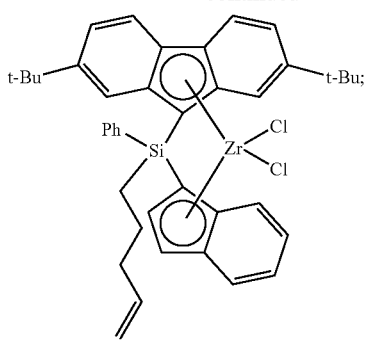
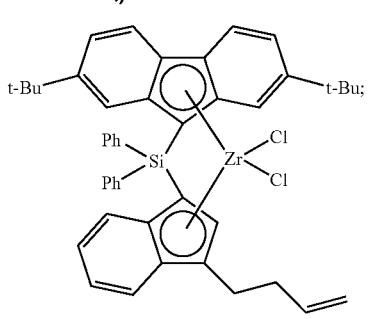
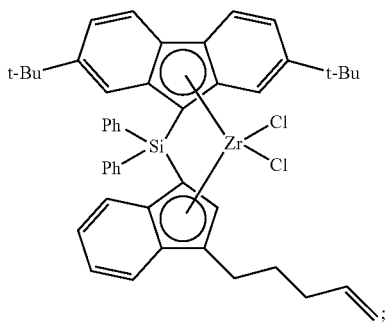
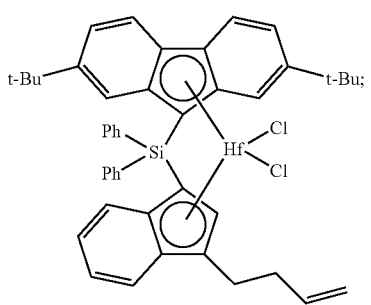
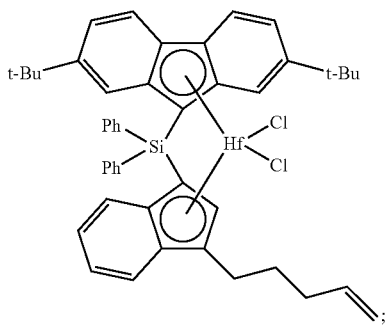

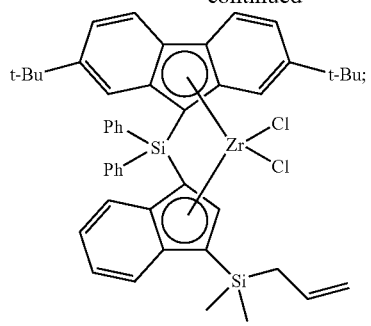
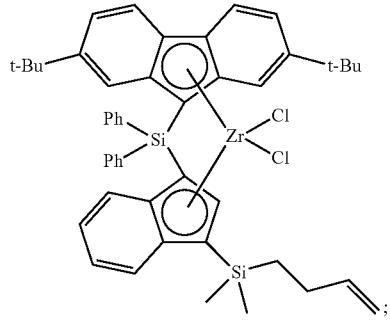
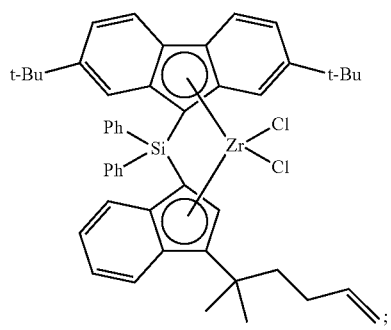
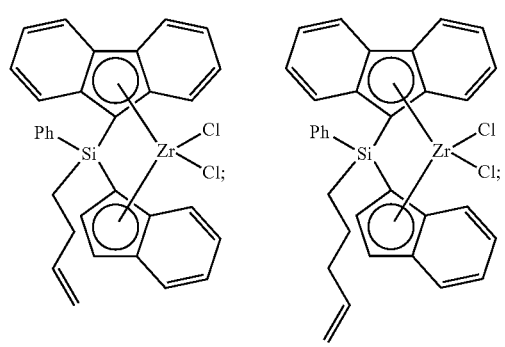
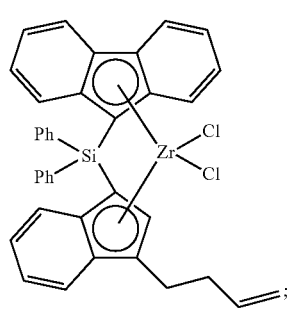
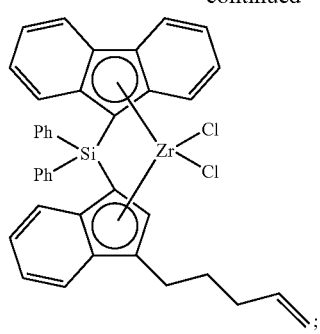
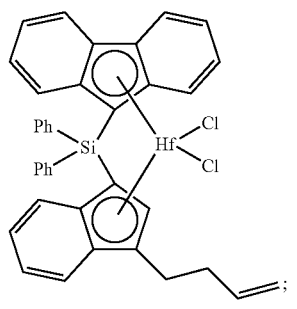
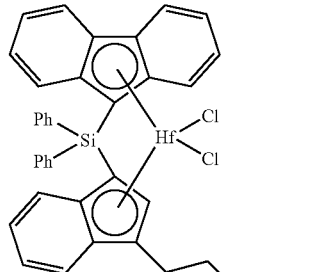
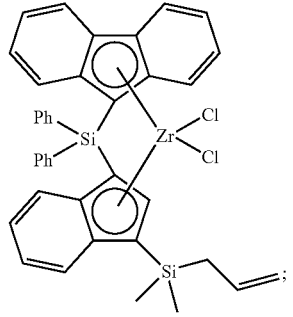
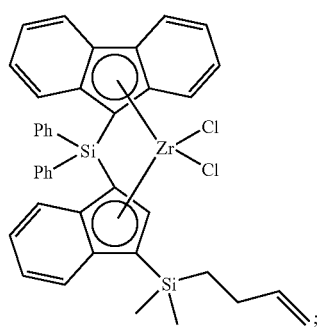

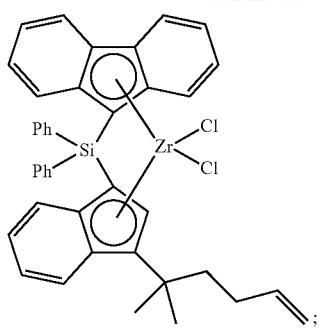
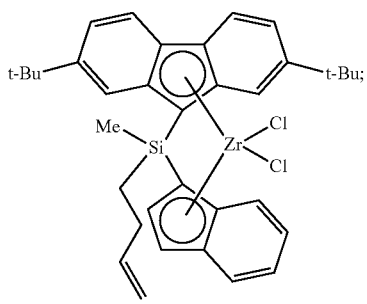
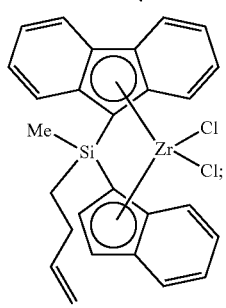
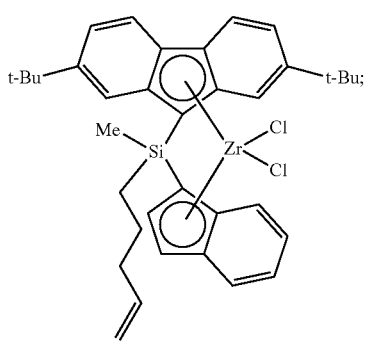
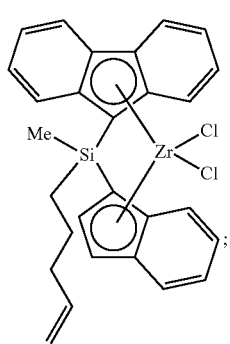
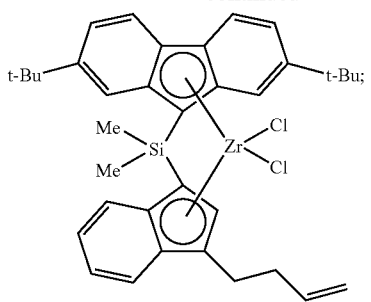
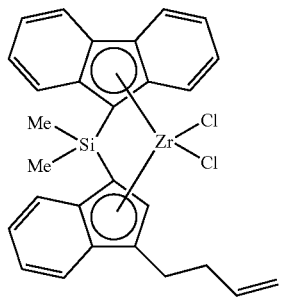
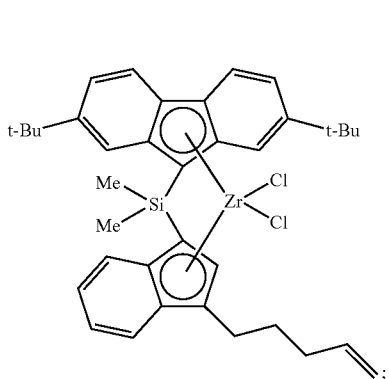
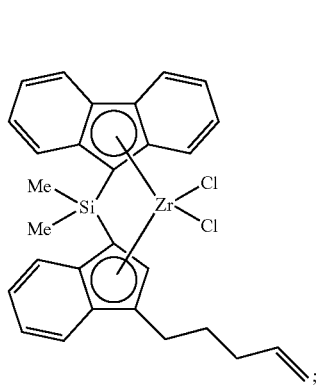
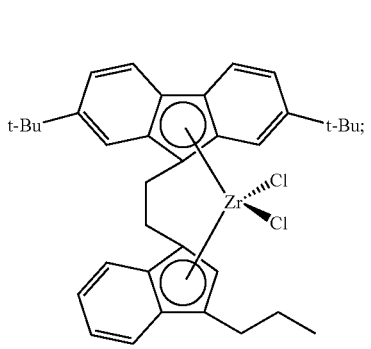

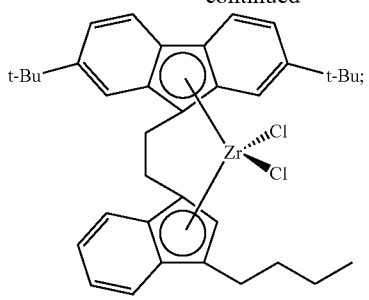
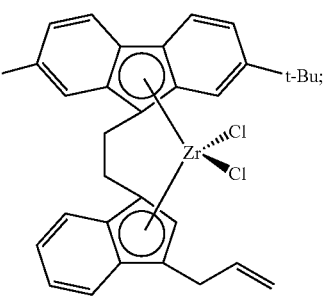
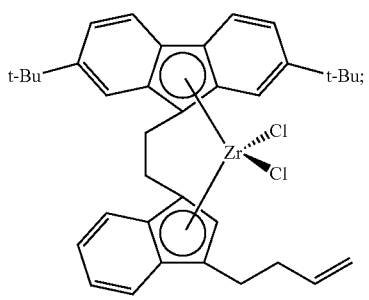
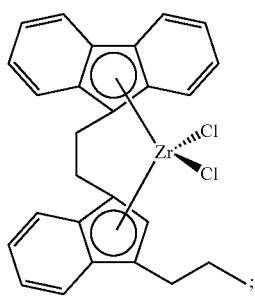
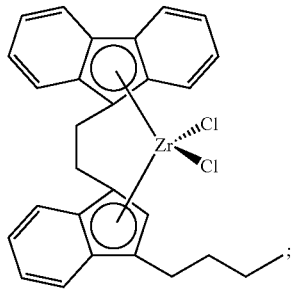
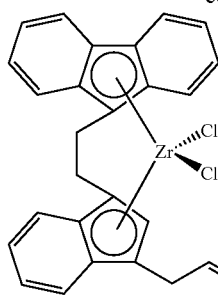
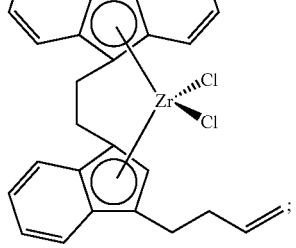
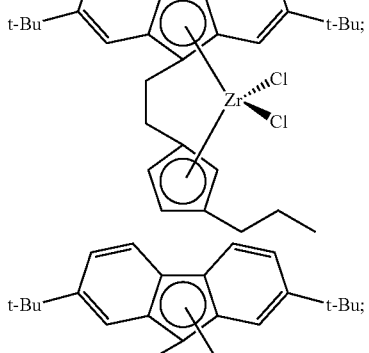
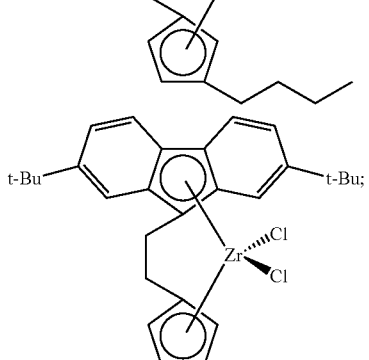
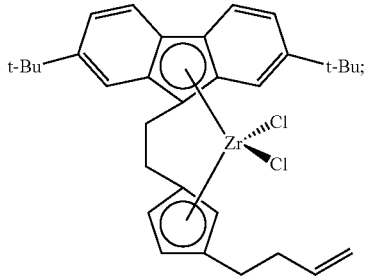

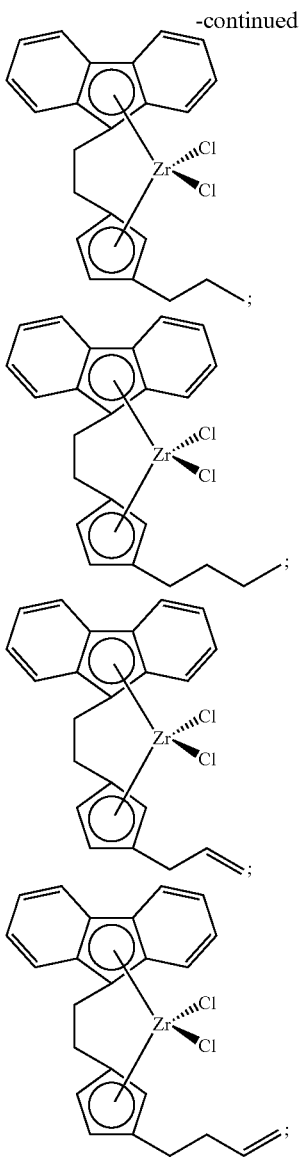

and the like, or any combination thereof.

In other aspects, catalyst component I can comprise a bridged metallocene compound having formula (D):

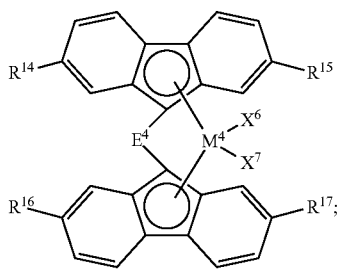

wherein:

$M^4$ is Zr or Hf;

$X^6$ and $X^7$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$E^4$ is a bridging group selected from:
  a cyclic or heterocyclic bridging group having up to 18 carbon atoms,
  a bridging group having the formula $>E^{4A}R^{12A}R^{13A}$, wherein $E^{4A}$ is C or Si, and $R^{12A}$ and $R^{13A}$ are independently H or a hydrocarbyl group having up to 18 carbon atoms,
  a bridging group having the formula $—CR^{12B}R^{13B}—CR^{12C}R^{13C}—$, wherein $R^{12B}$, $R^{13B}$, $R^{12C}$, and $R^{13C}$ are independently H or a hydrocarbyl group having up to 10 carbon atoms, or
  a bridging group having the formula $—SiR^{12D}R^{13D}—SiR^{12E}R^{13E}—$, wherein $R^{12D}$, $R^{13D}$, $R^{12E}$ and $R^{13E}$ are independently H or a hydrocarbyl group having up to 10 carbon atoms; and $R^{14}$, $R^{15}$, $R^{16}$, and $R^{17}$ are independently H or a hydrocarbyl group having up to 18 carbon atoms.

In formula (D), $M^4$ is Zr or Hf. $X^6$ and $X^7$ independently can be F; Cl; Br; I; methyl; benzyl; phenyl; H; $BH_4$; $OBR_2$ or $SO_3R$, wherein R is an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms.

$X^6$ and $X^7$ independently can be F, Cl, Br, I, benzyl, phenyl, or methyl. For example, $X^6$ and $X^7$ independently are Cl, benzyl, phenyl, or methyl in one aspect of this invention. In another aspect, $X^6$ and $X^7$ independently are benzyl, phenyl, or methyl. Yet, in another aspect, both $X^6$ and $X^7$ can be Cl; alternatively, both $X^6$ and $X^7$ can be benzyl; alternatively, both $X^6$ and $X^7$ can be phenyl; or alternatively, both $X^6$ and $X^7$ can be methyl.

In formula (D), $E^4$ is a bridging group. In accordance with an aspect of this invention, $E^4$ can be a cyclic or heterocyclic bridging group having up to 18 carbon atoms, or alternatively, up to 12 carbon atoms. Cyclic groups include cycloalkyl and cycloalkenyl moieties and such moieties can include, but are not limited to, cyclopentyl, cyclopentenyl, cyclohexyl, cyclohexenyl, and the like. For instance, $E^4$ can be a cyclopentyl or cyclohexyl moiety. Heteroatom-substituted cyclic groups can be formed with nitrogen, oxygen, or sulfur heteroatoms. While these heterocyclic groups can have up to 12 or 18 carbons atoms, the heterocyclic groups can be 3-membered, 4-membered, 5-membered, 6-membered, or 7-membered groups in some aspects of this invention.

In accordance with another aspect of this invention, $E^4$ is a bridging group having the formula $>E^{4A}R^{12A}R^{13A}$, wherein $E^{4A}$ is C or Si, and $R^{12A}$ and $R^{13A}$ are independently H or a hydrocarbyl group having up to 18 carbon atoms or, alternatively, up to 12 carbon atoms. For instance, $R^{12A}$ and $R^{13A}$ independently can be H or an alkyl, alkenyl (e.g., a terminal alkenyl), or aryl group having up to 12 carbon atoms. Illustrative non-limiting examples of suitable "aryl" moieties for $R^{12A}$ and/or $R^{13A}$ include phenyl, tolyl, benzyl, dimethylphenyl, trimethylphenyl, phenylethyl, phenylpropyl, phenylbutyl, propyl-2-phenylethyl, and the like. In one aspect, $R^{12A}$ and $R^{13A}$ independently can be an alkyl, a terminal alkenyl, or aryl group having up to 10 carbon atoms. In another aspect, $R^{12A}$ and $R^{13A}$ are independently H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl. In yet another aspect, $R^{12A}$ and $R^{13A}$ are the same, and are methyl, ethyl, propyl, butyl, pentyl, or phenyl. In still another aspect, at least one of $R^{12A}$ and $R^{13A}$ is phenyl and/or at least one of $R^{12A}$ and $R^{13A}$ is a terminal alkenyl group having up to 8 carbon atoms.

In accordance with another aspect of this invention, $E^4$ is a bridging group having the formula —$CR^{12B}R^{13B}$—$CR^{12C}R^{13C}$—, wherein $R^{12B}$, $R^{13B}$, $R^{12C}$, and $R^{13C}$ are independently H or a hydrocarbyl group having up to 10 carbon atoms or, alternatively, up to 6 carbon atoms. For instance, $R^{12B}$, $R^{13B}$, $R^{12C}$, and $R^{13C}$ independently can be H or an alkyl or an alkenyl group having up to 6 carbon atoms; alternatively, $R^{12B}$, $R^{13B}$, $R^{12C}$, and $R^{13C}$ independently can be H, methyl, ethyl, propyl, butyl, allyl, butenyl, or pentenyl; alternatively, $R^{12B}$, $R^{13B}$, $R^{12C}$, and $R^{13C}$ independently can be H, methyl, ethyl, propyl, or butyl; alternatively, $R^{12B}$, $R^{13B}$, $R^{12C}$, and $R^{13C}$ independently can be H, methyl, or ethyl; alternatively, $R^{12B}$, $R^{13B}$, $R^{12C}$, and $R^{13C}$ can be H; or alternatively, $R^{12B}$, $R^{13B}$, $R^{12C}$, and $R^{13C}$ can be methyl.

In accordance with another aspect of this invention, $E^4$ is a bridging group having the formula —$SiR^{12D}R^{13D}$—$SiR^{12E}R^{13E}$—, wherein $R^{12D}$, $R^{13D}$, $R^{12E}$, and $R^{13E}$ are independently H or a hydrocarbyl group having up to 10 carbon atoms or, alternatively, up to 6 carbon atoms. Accordingly, in aspects of this invention, $R^{12D}$, $R^{13D}$, $R^{12E}$, and $R^{13E}$ independently can be H or an alkyl or an alkenyl group having up to 6 carbon atoms; alternatively, $R^{12D}$, $R^{13D}$, $R^{12E}$, and $R^{13E}$ independently can be H, methyl, ethyl, propyl, butyl, allyl, butenyl, or pentenyl; alternatively, $R^{12D}$, $R^{13D}$, $R^{12E}$, and $R^{13E}$ independently can be H, methyl, ethyl, propyl, or butyl; alternatively, $R^{12D}$, $R^{13D}$, $R^{12E}$, and $R^{13E}$ independently can be H, methyl, or ethyl; alternatively, $R^{12D}$, $R^{13D}$, $R^{12E}$, and $R^{13E}$ can be H; or alternatively, $R^{12D}$, $R^{13D}$, $R^{12E}$, and $R^{13E}$ can be methyl.

$R^{14}$, $R^{15}$, $R^{16}$, and $R^{17}$ on the fluorenyl groups in formula (D) are independently H or a hydrocarbyl group having up to 18 carbon atoms or, alternatively, having up to 12 carbon atoms. Accordingly, $R^{14}$, $R^{15}$, $R^{16}$, and $R^{17}$ independently can be H or a hydrocarbyl group having up to 8 carbon atoms, such as, for example, alkyl groups: methyl, ethyl, propyl, butyl, pentyl, or hexyl, and the like. In some aspects, $R^{14}$, $R^{15}$, $R^{16}$, and $R^{17}$ are independently methyl, ethyl, propyl, n-butyl, t-butyl, or hexyl, while in other aspects, $R^{14}$, $R^{15}$, $R^{16}$, and $R^{17}$ are independently H or t-butyl. For example, $R^{14}$, $R^{15}$, $R^{16}$, and $R^{17}$ can be H or, alternatively, $R^{14}$, $R^{15}$, $R^{16}$, and $R^{17}$ can be t-butyl.

It is contemplated that $X^6$ and $X^7$ independently can be F, Cl, Br, I, benzyl, phenyl, or methyl in formula (D), and $R^{14}$, $R^{15}$, $R^{16}$, and $R^{17}$ independently can be H or t-butyl. In these and other aspects, $E^4$ can be cyclopentyl or cyclohexyl; alternatively, $E^4$ can be a bridging group having the formula >$E^{4A}R^{12A}R^{13A}$, wherein $E^{4A}$ is C or Si, and $R^{12A}$ and $R^{13A}$ are independently H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, or benzyl; alternatively, $E^4$ can be a bridging group having the formula —$CR^{12B}R^{13B}$—$CR^{12C}R^{13C}$—, wherein $R^{12B}$, $R^{13B}$, $R^{12C}$, and $R^{13C}$ are independently H or methyl; or alternatively, $E^4$ can be a bridging group having the formula —$SiR^{12D}R^{13D}$—$SiR^{12E}R^{13E}$—, wherein $R^{12D}$, $R^{13D}$, $R^{12E}$, and $R^{13E}$ are independently H or methyl.

Non-limiting examples of ansa-metallocene compounds having formula (D) that are suitable for use in catalyst component I include, but are not limited to, the following:

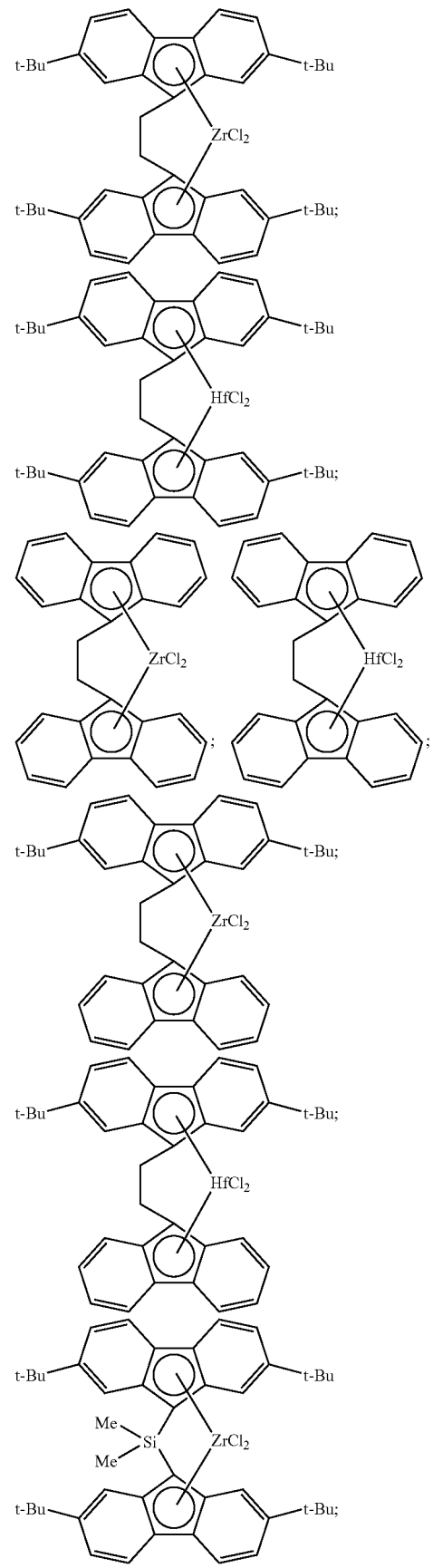

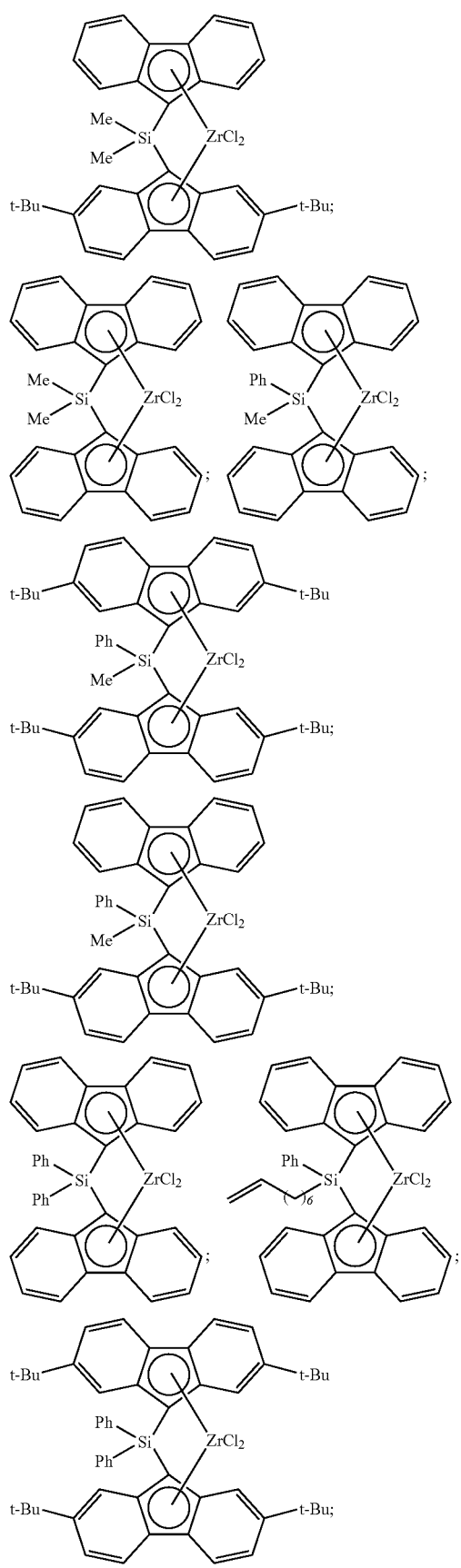
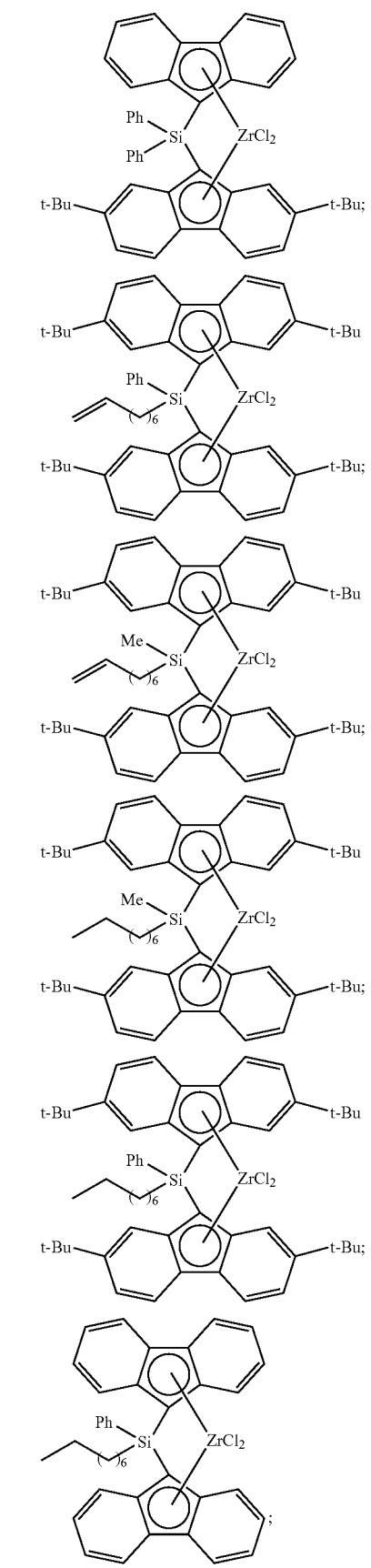

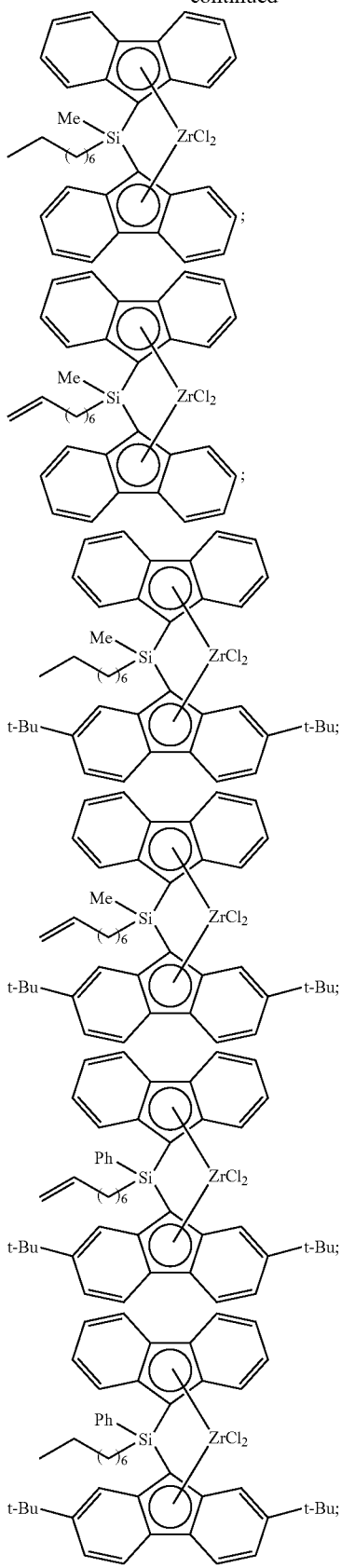

and the like, or any combination thereof.

It is also contemplated that catalyst component I can comprise a bridged metallocene compound having formula (A):

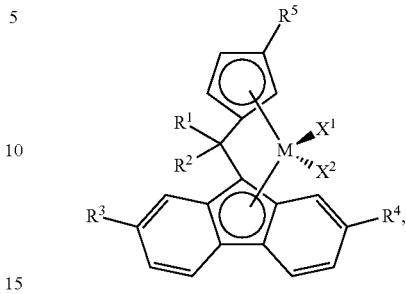

wherein:

M is Zr or Hf;

$X^1$ and $X^2$ are independently F, Cl, Br, I, benzyl, phenyl, or methyl;

$R^1$ and $R^2$ are independently H or an alkyl, alkenyl, or aryl group having up to 12 carbon atoms;

$R^3$ and $R^4$ are independently H or an alkyl group having up to 12 carbon atoms; and $R^5$ is H or an alkyl or alkenyl group having up to 12 carbon atoms.

In formula (A), M is Zr or Hf, and $X^1$ and $X^2$ independently can be F, Cl, Br, I, benzyl, phenyl, or methyl. For example, $X^1$ and $X^2$ independently are Cl, benzyl, phenyl, or methyl in one aspect of this invention. In another aspect, $X^1$ and $X^2$ independently are benzyl, phenyl, or methyl. Yet, in another aspect, both $X^1$ and $X^2$ can be Cl; alternatively, both $X^1$ and $X^2$ can be benzyl; alternatively, both $X^1$ and $X^2$ can be phenyl; or alternatively, both $X^1$ and $X^2$ can methyl.

Substituents $R^1$ and $R^2$ on the carbon bridging atom are independently H or an alkyl, alkenyl, or aryl group having up to 12 carbon atoms. For instance, $R^1$ and $R^2$ independently can be H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, benzyl, tolyl, or naphthyl, and the like. In accordance with one aspect of the present invention, $R^1$ and $R^2$ are independently methyl, ethyl, propyl, butyl, ethenyl, propenyl, butenyl, pentenyl, hexenyl, benzyl, or phenyl. In another aspect, $R^1$ and $R^2$ are independently H, methyl, ethyl, propyl, butyl, pentyl, hexyl, ethenyl, propenyl, butenyl, pentenyl, or hexenyl. In yet another aspect, $R^1$ and $R^2$ are independently phenyl, benzyl, or tolyl. In still another aspect, $R^1$ and $R^2$ independently are H, methyl, propenyl, butenyl, pentenyl, phenyl, or benzyl.

Substituents on the cyclopentadienyl and fluorenyl groups can include H. On the fluorenyl group, $R^3$ and $R^4$ are independently H or an alkyl group having up to 12 carbon atoms. Accordingly, $R^3$ and $R^4$ independently can be H, methyl, ethyl, propyl, butyl, pentyl, hexyl, heptyl, octyl, nonyl, or decyl, and the like. In some aspects, $R^3$ and $R^4$ are independently methyl, ethyl, propyl, n-butyl, t-butyl, or hexyl, while in other aspects, $R^3$ and $R^4$ are independently H or t-butyl. For example, both $R^3$ and $R^4$ can be H or, alternatively, both $R^3$ and $R^4$ can be t-butyl.

On the cyclopentadienyl group, $R^5$ is H or an alkyl or alkenyl group having up to 12 carbon atoms. $R^5$ can be, for instance, H, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, and the like. Often, $R^5$ is H, methyl, ethyl, propyl, butyl, ethenyl, propenyl, butenyl, pentenyl, or hexenyl. In other aspects, $R^5$ is H, methyl, ethyl, propyl, butyl, pentyl, or hexyl; or alternatively, $R^5$ is ethenyl, propenyl, butenyl, pentenyl, hexenyl, or heptenyl.

In another aspect, at least one of $R^1$, $R^2$, and $R^5$ in formula (A) is an alkenyl group, such as, for instance, ethenyl, propenyl, butenyl, pentenyl, hexenyl, heptenyl, octenyl, nonenyl, or decenyl, and the like. At least one of $R^1$, $R^2$, and $R^5$ can be propenyl, butenyl, pentenyl, or hexenyl in some aspects of this invention.

Nonlimiting examples of suitable bridged metallocene compounds having formula (A) include the following structures (these compounds are abbreviated as MET-I-A and MET-I-B, respectively, in FIG. 1):

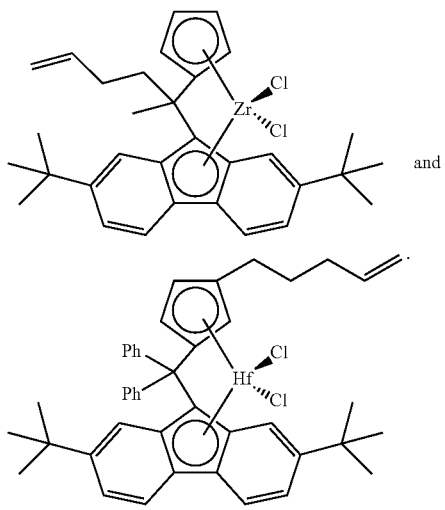

and

Other bridged metallocene compounds can be employed in component I of the catalyst compositions of the present invention. Therefore, the scope of the present invention is not limited to the bridged metallocenes of formula (C), formula (D), and/or formula (A).

Likewise, unbridged metallocene compounds can be used in catalyst component I of the present invention. Representative unbridged compounds with alkenyl substituents include, but are not limited to:

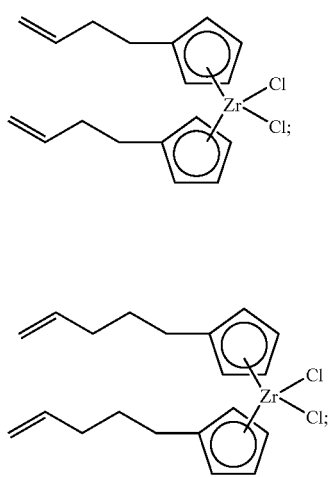

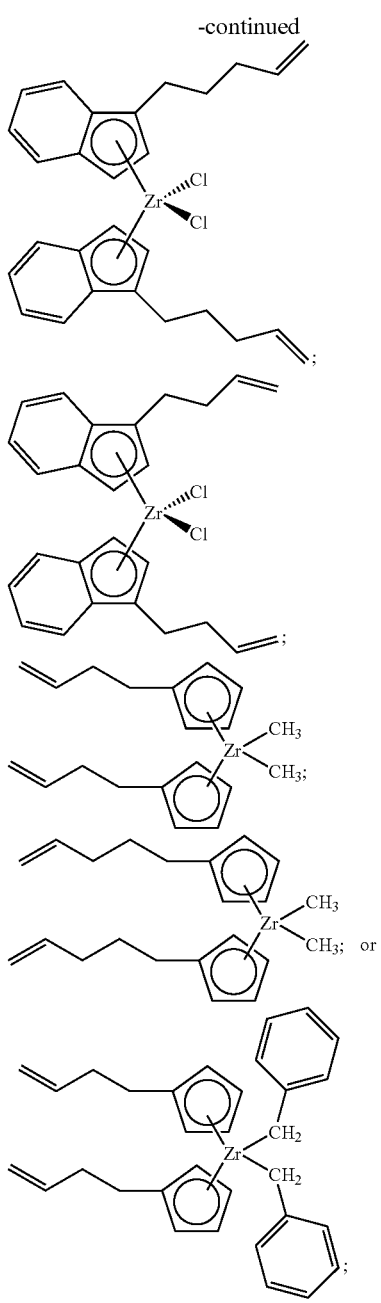

and the like.

Other unbridged metallocene compounds can be employed in component I of the catalyst compositions of the present invention. Therefore, the scope of the present invention is not limited to the unbridged metallocene species provided above.

Representative bridged and/or unbridged metallocene compounds, and methods of producing such compounds, which may be employed in some aspects of this invention are disclosed in U.S. Pat. Nos. 5,498,581, 7,226,886, 7,312,283, 7,456,243, 7,468,452, and 7,517,939, the disclosures of which are incorporated herein by reference in their entirety.

Other metallocene compounds, including half-sandwich and cyclodienyl compounds, can be used in catalyst component I of the present invention, and such compounds include, but are not limited to, the following:

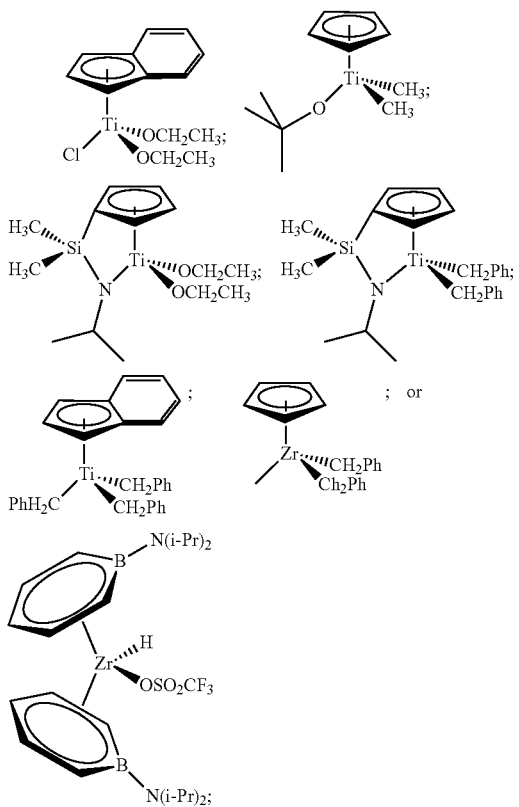

and the like (Ph=phenyl; i-Pr=isopropyl).

Furthermore, dinuclear metallocene compounds with an alkenyl linking group can be used in catalyst component I of the present invention. Such dinuclear metallocenes are disclosed, for example, in U.S. Patent Publication Nos. 2009-0170690 and 2009-0170691, and U.S. patent application Ser. No. 12/489,630, the disclosures of which are incorporated herein by reference in their entirety. For instance, catalyst component I can comprise a dinuclear compound formed from one alkenyl-substituted compound having formula (C), from one alkenyl-substituted compound having formula (D), from two different alkenyl-substituted compounds having formula (A), from an alkenyl-substituted compound having formula (C) and an alkenyl-substituted compound having formula (D), and so forth. For illustrative purposes, dinuclear metallocene compounds can be formed from the following representative metallocene compounds having formula (C) and formula (D), respectively:

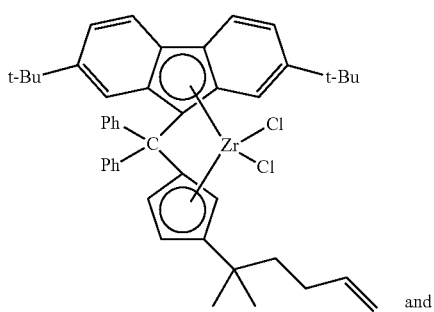

and

The metallocene compound having formula (C) has an alkenyl substituent on the cyclopentadienyl group and can be used to form a dinuclear compound as described in U.S. Patent Publication No. 2009/0170691. The metallocene compound having formula (D) has an alkenyl substituent on the silicon bridging atom and can be used to form a dinuclear compound as described in U.S. Patent Publication No. 2009/0170690. Additionally, any two metallocene compounds with alkenyl substituents having formula (C) and formula (D), respectively, can be used together to form a heterodinuclear compound as described in U.S. patent application Ser. No. 12/489,630.

In accordance with an aspect of the invention, catalyst component I can comprise a bridged metallocene; alternatively, an unbridged metallocene; or alternatively, a dinuclear metallocene. In another aspect, catalyst component I can comprise a metallocene compound containing an alkenyl moiety. For example, an unbridged or a bridged metallocene can contain an alkenyl substituent on a cyclopentadienyl, an indenyl, and/or a fluorenyl group. Alternatively, or in addition, a bridged metallocene can contain an alkenyl substituent on the bridging group (or on the bridging atom). Nonlimiting examples of such bridged metallocene compounds having an alkenyl substituent include the following structures (these compounds are abbreviated as MET-I-A and MET-I-B, respectively, in FIG. 1; Ph=phenyl):

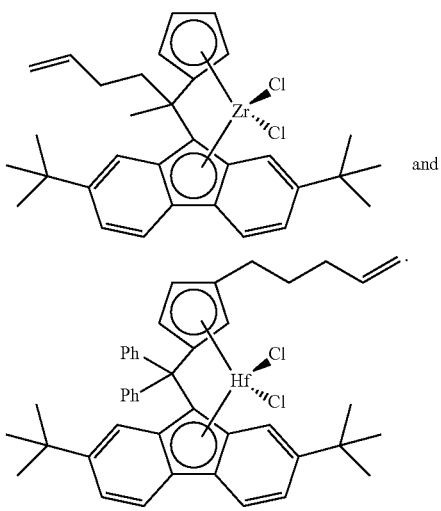

In accordance with an aspect of the invention, catalyst component I can comprise a Ti-based metallocene; alternatively, a Zr-based metallocene; or alternatively, a Hf-based metallocene. In another aspect, catalyst component I can comprise a metallocene compound having formula (C). In yet another aspect, catalyst component I can comprise a metallocene compound having formula (D). In still another aspect, catalyst component I can comprise a metallocene compound having formula (A). Furthermore, catalyst component I can comprise a metallocene compound having formula (C) or formula (D), wherein the metallocene compound contains at least one alkenyl moiety.

Catalyst Component II

A catalyst composition of the present invention comprises catalyst component II, which can comprise one or more hydrogen scavenging catalysts. Often, a hydrogen scavenging catalyst can comprise a hydrogenation catalyst comprising a transition metal such as Ru, Rh, Pt, Pd, Fe, Ni, Nb, Ti, Zn, and the like, or combinations thereof. For instance, hydrogen scavenging catalysts comprising Ti can include the following compounds:

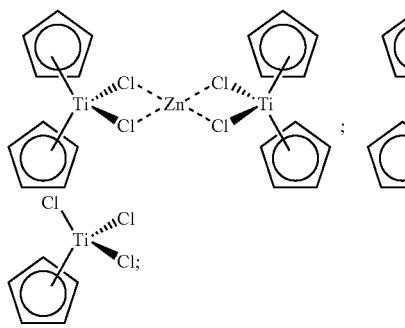

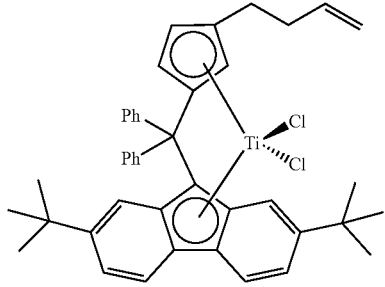

and the like.

Catalyst component II is not limited to titanium-based metallocene compounds. For instance, catalyst component II can comprise at least one of the following hydrogen scavenging catalysts:

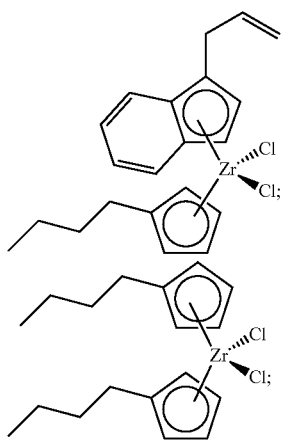

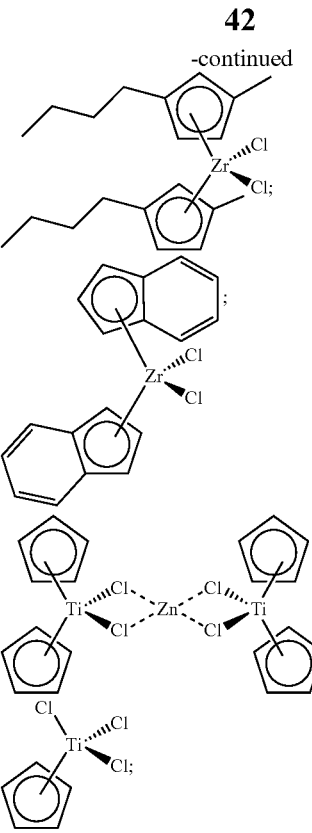

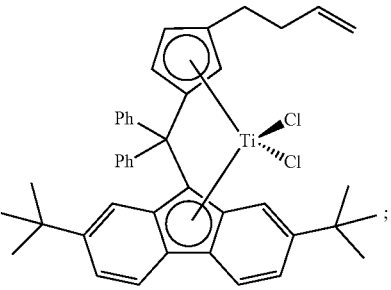

a compound having the formula

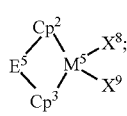

(E)

and the like, or any combination thereof.

With the exception of the compound having formula (E), these metallocene compounds are illustrated in FIG. 1 and are provided with abbreviations MET-II-A to MET-II-H, respectively. These compounds can be produced using any suitable method, including those disclosed in U.S. Pat. Nos. 7,199,073, 7,226,886, and 7,517,939, the disclosures of which are incorporated herein by reference in their entirety. For instance, MET-II-E can be produced via a zinc reduction of MET-II-F.

In formula (E), $M^5$ is Zr or Hf;

$X^8$ and $X^9$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$Cp^2$ and $Cp^3$ are independently a cyclopentadienyl or indenyl, any substituent on $Cp^2$ and $Cp^3$ is independently H or a hydrocarbyl group having up to 18 carbon atoms; and $E^5$ is a bridging group having the formula —$(CH_2)_n$—, wherein n is an integer from 2 to 8, inclusive.

In formula (E), $M^5$ can be Zr or Hf, while $X^8$ and $X^9$ independently can be F; Cl; Br; I; methyl; benzyl; phenyl; H; $BH_4$; $OBR_2$ or $SO_3R$, wherein R is an alkyl or aryl group; or a hydrocarbyloxide group, a hydrocarbylamino group, or a hydrocarbylsilyl group. The hydrocarbyloxide group, the hydrocarbylamino group, the hydrocarbylsilyl group and R can have up to 18 carbon atoms or, alternatively, up to 12 carbon atoms.

$X^8$ and $X^9$ independently can be F, Cl, Br, I, benzyl, phenyl, or methyl. For example, $X^8$ and $X^9$ independently are Cl, benzyl, phenyl, or methyl in one aspect of this invention. In another aspect, $X^8$ and $X^9$ independently are benzyl, phenyl, or methyl. Yet, in another aspect, both $X^8$ and $X^9$ can be Cl; alternatively, both $X^8$ and $X^9$ can be benzyl; alternatively, both $X^8$ and $X^9$ can be phenyl; or alternatively, both $X^8$ and $X^9$ can be methyl.

In formula (E), $Cp^2$ and $Cp^3$ are independently a cyclopentadienyl or an indenyl group. Often, $Cp^2$ and $Cp^3$ are each a cyclopentadienyl group or each an indenyl group. Any substituent on $Cp^2$ and $Cp^3$ independently can be H or a hydrocarbyl group having up to 18 carbon atoms, or alternatively, any substituent can be H or a hydrocarbyl group having up to 12 carbon atoms. Possible substituents on $Cp^2$ and $Cp^3$ may include H, therefore this invention comprises partially saturated ligands such as tetrahydroindenyl, partially saturated indenyl, and the like.

In one aspect, $Cp^2$ and $Cp^3$ have no substitutions other than those shown in formula (E), e.g., no substituents other than the bridging group $E^5$. In another aspect, $Cp^2$ and/or $Cp^3$ can have one or two substituents, and each substituent independently can be H or a hydrocarbyl group having up to 10 carbon atoms, such as, for example, an alkyl, alkenyl, or aryl group. Yet, in another aspect, $Cp^2$ and/or $Cp^3$ can have one or two substituents, and each substituent independently can be H, methyl, ethyl, propyl, butyl, pentyl, hexyl, heptyl, octyl, ethenyl, propenyl, butenyl, pentenyl, hexenyl, heptenyl, octenyl, phenyl, tolyl, or benzyl, while in other aspects, each substituent independently can be methyl, ethyl, propyl, butyl, ethenyl, propenyl, butenyl, or pentenyl.

In formula (E), $E^5$ is a bridging group having the formula —$(CH_2)_n$—, wherein n is an integer from 2 to 8, inclusive. The integer n can be 3, 4, 5, 6, 7, or 8 in some aspects of this invention; alternatively, n can be 3, 4, 5, or 6; or alternatively, n can be 3 or 4.

In an aspect of this invention, $X^8$ and $X^9$ in formula (E) independently can be F, Cl, Br, I, benzyl, phenyl, or methyl, and in some aspects, n can be an integer from 2 to 8, inclusive; or alternatively, n can be 3, 4, 5, or 6. Additionally, $Cp^2$ and $Cp^3$ can be unsubstituted cyclopentadienyl groups or unsubstituted indenyl groups (i.e., excluding the bridging group). Alternatively, $Cp^2$ and $Cp^3$ independently may be substituted with one or two substituents, and these substituents independently can be H or a hydrocarbyl group having up to 10 carbon atoms, such as, for example, methyl ethyl, propyl, butyl, pentyl, hexyl, heptyl, octyl, ethenyl, propenyl, butenyl, pentenyl, hexenyl, heptenyl, octenyl, phenyl, tolyl, or benzyl.

Non-limiting examples of metallocene compounds having formula (E) that are suitable for use in catalyst component II include, but are not limited to, the following:

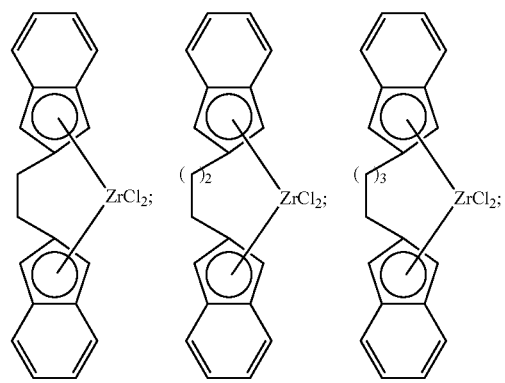

and the like, or any combination thereof.

Catalyst component II also may comprise a dinuclear compound formed from one or more alkenyl-substituted hydrogen scavenging catalysts, such as a compound having formula (E) containing an alkenyl substituent, or a compound having the following formula (referred to herein as MET-II-A):

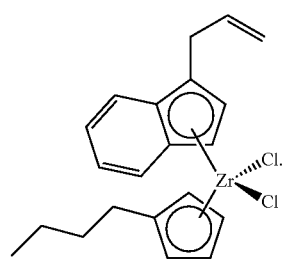

This unbridged metallocene compound (MET-II-A) has an alkenyl substituent on the indenyl group and can be used to form a dinuclear compound as described in U.S. Patent Publication No. 2009/0171041, the disclosure of which is incorporated herein by reference in its entirety.

In accordance with one aspect of the present invention, catalyst component II can comprise MET-II-A, MET-II-B, MET-II-C, MET-II-D, a compound having formula (E), or any combination thereof. In accordance with another aspect of the present invention, catalyst component II can comprise MET-II-E, MET-II-F, MET-II-G, MET-II-H, a compound having formula (E), or any combination thereof. In accordance with yet another aspect of the present invention, catalyst component II comprises MET-II-A. In accordance with still another aspect of the present invention, catalyst component II comprises MET-II-B; alternatively, comprises MET-II-C; alternatively, comprises MET-II-D; alternatively, comprises MET-II-E; alternatively, comprises MET-II-F; alternatively, comprises MET-II-G; alternatively, comprises MET-II-H; alternatively, comprises a compound having formula (E); alternatively, comprises a Ru-based and/or Rh-based hydrogenation catalyst; alternatively, comprises a Pt-based hydrogenation catalyst; alternatively, comprises a Pd-based hydrogenation catalyst; alternatively, comprises a Fe-based hydrogenation catalyst; alternatively, comprises a Ni-based hydrogenation catalyst; alternatively, comprises a Nb-based hydrogenation catalyst; or alternatively, comprises a Ti-based hydrogenation catalyst.

The hydrogen scavenging catalyst of catalyst component II may produce a different material than catalyst component I produces during the polymerization process. For instance, in an ethylene polymerization, the hydrogen scavenging catalyst may produce ethane, and/or the hydrogen scavenging catalyst may produce $C_4$, $C_6$, $C_8$, etc., alkanes, and/or the hydrogen scavenging catalyst may produce low molecular weight oligomers (e.g., lower molecular weight than produced by catalyst component I).

Activator-Support

The present invention encompasses various catalyst compositions containing an activator, which can be an activator-support. In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this invention are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present invention, the solid oxide used to prepare the chemically-treated solid oxide has a pore volume greater than about 0.1 cc/g. According to another aspect of the present invention, the solid oxide has a pore volume greater than about 0.5 cc/g. According to yet another aspect of the present invention, the solid oxide has a pore volume greater than about 1.0 cc/g.

In another aspect, the solid oxide has a surface area of from about 100 to about 1000 m²/g. In yet another aspect, the solid oxide has a surface area of from about 200 to about 800 m²/g. In still another aspect of the present invention, the solid oxide has a surface area of from about 250 to about 600 m²/g.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, aluminum phosphate, aluminophosphate, heteropolytungstate, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this invention also encompasses oxide materials such as silica-coated alumina, as described in U.S. Patent Publication No. 2010-0076167, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present invention. It is contemplated that the electron-withdrawing anion can be, or can comprise, fluoride, chloride, bromide, phosphate, triflate, bisulfate, or sulfate, and the like, or any combination thereof, in some aspects of this invention. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions of the present invention can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In some aspects, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present invention, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present invention. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present invention, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present invention, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present invention, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4 PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BF_4$) also can be employed. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this invention, the amount of fluoride or chloride ion present before calcining the solid oxide is from about 1 to about 25% by weight, and according to another aspect of this invention, from about 2 to about 20% by weight. According to yet another aspect of this invention, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present invention, the pore volume is greater than about 0.8 cc/g, and according to another aspect of the present invention, greater than about 1.0 cc/g. Further, the silica-alumina generally has a surface area greater than about 100 m$^2$/g. According to another aspect of this invention, the surface area is greater than about 250 m$^2$/g. Yet, in another aspect, the surface area is greater than about 350 m$^2$/g.

The silica-alumina utilized in the present invention typically has an alumina content from about 5 to about 95% by weight. According to one aspect of this invention, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this invention, the solid oxide component comprises alumina without silica, and according to another aspect of this invention, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present invention, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining is from about 0.5 to about 100 parts by weight sulfate ion to about 100 parts by weight solid oxide. According to another aspect of this invention, the amount of sulfate ion present before calcining is from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention comprises an ion-exchangeable activator-support, including but not limited to silicate and aluminosilicate compounds or minerals, either with layered or non-layered structures, and combinations thereof. In another aspect of this invention, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present invention, one or more of the metallocene compounds and/or hydrogen scavenging catalysts can be precontacted with an olefin monomer and an organoaluminum compound for a first period of time prior to contacting this mixture with the activator-support. Once the precontacted mixture of the metallocene compound and/or hydrogen scavenging catalyst, olefin monomer, and organoaluminum compound is contacted with the activator-support, the composition further comprising the activator-support is termed a "postcontacted" mixture. The postcontacted mixture can be allowed to remain in further contact for a second period of time prior to being charged into the reactor in which the polymerization process will be carried out.

According to yet another aspect of the present invention, one or more of the metallocene compounds and/or hydrogen scavenging catalysts can be precontacted with an olefin monomer and an activator-support for a first period of time prior to contacting this mixture with the organoaluminum compound. Once the precontacted mixture of the metallocene compound and/or hydrogen scavenging catalyst, olefin monomer, and activator-support is contacted with the organoaluminum compound, the composition further comprising the organoaluminum is termed a "postcontacted" mixture. The postcontacted mixture can be allowed to remain in further contact for a second period of time prior to being introduced into the polymerization reactor.

Organoaluminum Compounds

In some aspects, catalyst compositions of the present invention can comprise one or more organoaluminum compounds. Such compounds can include, but are not limited to, compounds having the formula:

$(R^C)_3Al$;

where $R^C$ is an aliphatic group having from 1 to 10 carbon atoms. For example, $R^C$ can be methyl, ethyl, propyl, butyl, hexyl, or isobutyl.

Other organoaluminum compounds which can be used in catalyst compositions disclosed herein can include, but are not limited to, compounds having the formula:

$Al(X^A)_m(X^B)_{3-m}$, where $X^A$ is a hydrocarbyl; $X^B$ is an alkoxide or an aryloxide, a halide, or a hydride; and m is from 1 to 3, inclusive. Hydrocarbyl is used herein to specify a hydrocarbon radical group and includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, and/or heteroatom substituted derivatives thereof.

In one aspect, $X^A$ is a hydrocarbyl having from 1 to about 18 carbon atoms. In another aspect of the present invention, $X^A$ is an alkyl having from 1 to 10 carbon atoms. For example, $X^A$ can be methyl, ethyl, propyl, n-butyl, sec-butyl, isobutyl, or hexyl, and the like, in yet another aspect of the present invention.

According to one aspect of the present invention, $X^B$ is an alkoxide or an aryloxide, any one of which has from 1 to 18 carbon atoms, a halide, or a hydride. In another aspect of the present invention, $X^B$ is selected independently from fluorine and chlorine. Yet, in another aspect, $X^B$ is chlorine.

In the formula, $Al(X^A)_m(X^B)_{3-m}$, m is a number from 1 to 3, inclusive, and typically, m is 3. The value of m is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. In some aspects, the organoaluminum compound comprises TMA, TEA, TNPA, TNBA, TIBA, tri-n-hexylaluminum, tri-n-octylaluminum, or a combination thereof; alternatively, comprises TMA; alternatively, comprises TEA; alternatively, comprises TNPA; alternatively, comprises TNBA; alternatively, comprises TIBA; alternatively, comprises tri-n-hexylaluminum; or alternatively, comprises tri-n-octylaluminum.

The present invention contemplates a method of precontacting a metallocene compound and/or a hydrogen scavenging catalyst with an organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components are contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention further provides a catalyst composition which can comprise an aluminoxane compound. As used herein, the term "aluminoxane" refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

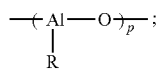

wherein R in this formula is a linear or branched alkyl having from 1 to 10 carbon atoms, and p is an integer from 3 to 20, are encompassed by this invention. The AlRO moiety shown here also constitutes the repeating unit in a linear aluminoxane. Thus, linear aluminoxanes having the formula:

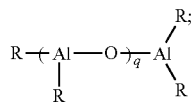

wherein R in this formula is a linear or branched alkyl having from 1 to 10 carbon atoms, and q is an integer from 1 to 50, are also encompassed by this invention.

Further, aluminoxanes can have cage structures of the formula $R^t_{5r+\alpha}R^b_{r\alpha}Al_{4r}O_{3r}$, wherein $R^t$ is a terminal linear or branched alkyl group having from 1 to 10 carbon atoms; $R^b$ is a bridging linear or branched alkyl group having from 1 to 10 carbon atoms; r is 3 or 4; and α is equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_q AlR_2$, and the like. In these formulas, the R group is typically a linear or branched $C_1$-$C_6$ alkyl, such as methyl, ethyl, propyl, butyl, pentyl, or hexyl. Examples of aluminoxane compounds that can be used in accordance with the present invention include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_q AlR_2$, respectively. In some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene compound(s) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^C)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes are prepared by reacting an aluminum alkyl compound, such as $(R^C)_3Al$, with a hydrated salt, such as hydrated copper sulfate, in an inert organic solvent.

Organoboron/Organoborate Compounds

According to another aspect of the present invention, the catalyst composition can comprise an organoboron or organoborate compound. Such compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used as co-catalysts in the present invention include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compounds in the catalyst composition is in a range from about 0.1:1 to about 15:1. Typically, the amount of the fluoroorgano boron or fluoroorgano borate compound used is from about 0.5 moles to about 10 moles of boron/borate compound per mole of metallocene compounds (catalyst component I, catalyst component II, and any other metallocene compound(s)). According to another aspect of this invention, the amount of fluoroorgano boron or fluoroorgano borate compound is from about 0.8 moles to about 5 moles of boron/borate compound per mole of metallocene compounds.

Ionizing Ionic Compounds

The present invention further provides a catalyst composition which can comprise an ionizing ionic compound. An ionizing ionic compound is an ionic compound that can function as a co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand, from the metallocene. However, the ionizing ionic compound is an activator or co-catalyst regardless of whether it is ionizes the metallocene, abstracts a ligand in a fashion as to form an ion pair, weakens the metal-ligand bond in the metallocene, simply coordinates to a ligand, or activates the metallocene by some other mechanism.

Further, it is not necessary that the ionizing ionic compound activate the metallocene compound(s) only. The activation function of the ionizing ionic compound can be evident in the enhanced activity of catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoro-methyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoro-methyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis-(pentafluorophenyl)borate, potassium tetraphenylborate, potassium tetrakis(p-tolyl)borate, potassium tetrakis(m-tolyl)borate, potassium tetrakis(2,4-dimethyl-phenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluoro-phenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl)aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally contain a major amount of ethylene (>50 mole percent) and a minor amount of comonomer (<50 mole percent), though this is not a requirement. Comonomers that can be copolymerized with ethylene often have from 3 to 20 carbon atoms in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described above. Styrene can also be employed as a monomer in the present invention. In an aspect, the olefin monomer is a $C_2$-$C_{10}$ olefin; alternatively, the olefin monomer is ethylene; or alternatively, the olefin monomer is propylene.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process comprises ethylene. In this aspect, examples of suitable olefin comonomers include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomer can comprise 1-butene, 1-pentene, 1-hexene, 1-octene, 1-decene, styrene, or any combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one monomer/reactant is ethylene, so the polymerizations are either a homopolymerization involving only ethylene, or copolymerizations with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Composition

The present invention employs catalyst compositions containing catalyst component I, catalyst component II, and at least one activator. For example, in one aspect, a suitable catalyst composition can comprise catalyst component I, catalyst component II, and an activator-support (e.g., a chemically-treated solid oxide), while in another aspect, a suitable catalyst composition can comprise catalyst component I, catalyst component II, and an aluminoxane (e.g., methylaluminoxane). Optionally, these catalyst compositions can further comprise one or more organoaluminum compounds. These catalyst compositions can be utilized to produce polyolefins—homopolymers, copolymers, and the like—for a variety of end-use applications. The catalyst components I and II were discussed above.

In accordance with aspects of the present invention, it is contemplated that catalyst component I can contain more than one metallocene compound and/or catalyst component II can contain more than one hydrogen scavenging catalyst. Further, additional catalytic compounds—other than those specified in catalyst component I or catalyst component II—can be employed in the catalyst composition and/or the polymerization process, provided that the additional catalytic compound(s) does not detract from the advantages disclosed herein. Additionally, more than one activator (e.g., more than one activator-support, a combination of an activator-support and an aluminoxane, etc.) and/or more than one organoaluminum compound also may be utilized.

Catalyst compositions of the present invention can comprise catalyst component I, catalyst component II, and at least one activator. For instance, the activator can comprise an activator-support, an aluminoxane compound, an organoboron or organoborate compound, an ionizing ionic compound, and the like, or combinations thereof. Accordingly, the catalyst composition can comprise catalyst component I, catalyst component II, and an activator-support; alternatively, the catalyst composition can comprise catalyst component I, catalyst component II, and an aluminoxane compound; alternatively, the catalyst composition can comprise catalyst component I, catalyst component II, and an organoboron or organoborate compound; or alternatively, the catalyst composition can comprise catalyst component I, catalyst component II, and an ionizing ionic compound. Optionally, the catalyst composition can further comprise an organoaluminum compound.

In some aspects, catalyst compositions of the present invention comprise catalyst component I, catalyst component II, at least one activator-support, and at least one organoaluminum compound. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. Additionally, the organoaluminum compound can comprise trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free of organoboron or organoborate compounds; or alternatively, substantially free of ionizing ionic compounds. In these aspects, the catalyst composition has catalyst activity, to be discussed below, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these materials can be employed. For example, a catalyst composition comprising catalyst component I, catalyst component II, an activator-support, and an organoaluminum compound, can further comprise an optional co-catalyst. Suitable co-catalysts in this aspect include, but are not limited to, aluminoxane compounds, organoboron or organoborate compounds, ionizing ionic compounds, and the like, or any combination thereof. More than one co-catalyst can be present in the catalyst composition.

In a particular aspect contemplated herein, the catalyst composition is a dual catalyst composition comprising an activator (one or more than one activator-support, aluminoxane, etc.), optionally an organoaluminum compound (one or more than one), only one catalyst component I metallocene compound, and only one catalyst component II hydrogen scavenging catalyst. For example, the catalyst composition can comprise an activator-support; an organoaluminum compound; only one bridged metallocene compound having an alkenyl moiety; and only one hydrogen scavenging catalyst selected from a hydrogenation catalyst comprising Ru, Rh, Pt, Pd, Fe, Ni, Nb, or Ti, MET-II-A, MET-II-B, MET-II-C, MET-II-D, MET-II-E, MET-II-F, MET-II-G, MET-II-H, or a compound having formula (E); alternatively, the catalyst composition can comprise an activator-support; an organoaluminum compound; only one unbridged metallocene compound having an alkenyl moiety; and only one hydrogen scavenging catalyst selected from a hydrogenation catalyst comprising Ru, Rh, Pt, Pd, Fe, Ni, Nb, or Ti, MET-II-A, MET-II-B, MET-II-C, MET-II-D, MET-II-E, MET-II-F, MET-II-G, MET-II-H, or a compound having formula (E); alternatively, the catalyst composition can comprise an activator-support; an organoaluminum compound; only one dinuclear metallocene compound having an alkenyl linking group; and only one hydrogen scavenging catalyst selected from a hydrogenation catalyst comprising Ru, Rh, Pt, Pd, Fe, Ni, Nb, or Ti, MET-II-A, MET-II-B, MET-II-C, MET-II-D, MET-II-E, MET-II-F, MET-II-G, MET-II-H, or a compound having formula (E); alternatively, the catalyst composition can comprise an activator-support; an organoaluminum compound; only one compound having formula (C); and only one hydrogen scavenging catalyst selected from a hydrogenation catalyst comprising Ru, Rh, Pt, Pd, Fe, Ni, Nb, or Ti, MET-II-A, MET-II-B, MET-II-C, MET-II-D, MET-II-E, MET-II-F, MET-II-G, MET-II-H, or a compound having formula (E); alternatively, the catalyst composition can comprise an activator-support; an organoaluminum compound; only one compound having formula (D); and only one hydrogen scavenging catalyst selected from a hydrogenation catalyst comprising Ru, Rh, Pt, Pd, Fe, Ni, Nb, or Ti, MET-II-A, MET-II-B, MET-II-C, MET-II-D, MET-II-E, MET-II-F, MET-II-G, MET-II-H, or a compound having formula (E); or alternatively, the catalyst composition can comprise an activator-support; an organoaluminum compound; only one compound having formula (A); and only one hydrogen scavenging catalyst selected from a hydrogenation catalyst comprising Ru, Rh, Pt, Pd, Fe, Ni, Nb, or Ti, MET-II-A, MET-II-B, MET-II-C, MET-II-D, MET-II-E, MET-II-F, MET-II-G, MET-II-H, or a compound having formula (E). In these aspects, only two catalytic components are present in the catalyst composition, i.e., one catalyst component I metallocene compound and one catalyst component II hydrogen scavenging catalyst. It is also contemplated that a dual metallocene catalyst composition can contain minor amounts of an additional metallocene compound(s) and/or hydrogen scavenging catalyst(s), but this is not a requirement, and generally the dual catalyst composition can consist essentially of the aforementioned two components, and in the substantial absence of any additional catalytic materials, wherein any additional catalyst materials would not increase/decrease the activity of the catalyst composition by more than about 10% from the catalyst activity of the catalyst composition in the absence of the additional materials.

This invention further encompasses methods of making these catalyst compositions, such as, for example, contacting the respective catalyst components in any order or sequence.

The metallocene compound from catalyst component I, the hydrogen scavenging catalyst from catalyst component II, or both, can be precontacted with an olefinic monomer if desired, not necessarily the olefin monomer to be polymerized, and an organoaluminum compound for a first period of time prior to contacting this precontacted mixture with an activator-support. The first period of time for contact, the precontact time, between the metallocene compound and/or hydrogen scavenging catalyst, the olefinic monomer, and the organoaluminum compound typically ranges from a time period of about 1 minute to about 24 hours, for example, from about 0.05 hours to about 1 hour. Precontact times from about 10 minutes to about 30 minutes are also employed. Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, metallocene and/or hydrogen scavenging catalyst, activator-support, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once the precontacted mixture of the metallocene compound and/or hydrogen scavenging catalyst, olefin monomer, and organoaluminum co-catalyst is contacted with the activator-support, this composition (with the addition of the activator-support) is termed the "postcontacted mixture." The postcontacted mixture optionally remains in contact for a second period of time, the postcontact time, prior to initiating the polymerization process. Postcontact times between the precontacted mixture and the activator-support generally range from about 1 minute to about 24 hours. In a further aspect, the postcontact time is in a range from about 0.05 hours to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

According to one aspect of this invention, the molar ratio of the moles of metallocene compound (or compounds) in catalyst component I to the moles of organoaluminum compound in a catalyst composition generally is in a range from about 1:1 to about 1:10,000. In another aspect, the molar ratio is in a range from about 1:1 to about 1:1,000. Yet, in another aspect, the molar ratio of the moles of metallocene compound to the moles of organoaluminum compound is in a range from about 1:1 to about 1:100. These molar ratios reflect the ratio of total moles of metallocene compound (or compounds) to the total amount of organoaluminum compound (or compounds) in both the precontacted mixture and the postcontacted mixture combined, if precontacting and/or postcontacting steps are employed.

When a precontacting step is used, the molar ratio of the total moles of olefin monomer to total moles of component I metallocene(s) in the precontacted mixture is typically in a range from about 1:10 to about 100,000:1. Total moles of each component are used in this ratio to account for aspects of this invention where more than one olefin monomer and/or more than one metallocene is employed. Further, this molar ratio can be in a range from about 10:1 to about 1,000:1 in another aspect of the invention.

Generally, the weight ratio of organoaluminum compound to activator-support is in a range from about 10:1 to about 1:1000. If more than one organoaluminum compound and/or more than one activator-support is employed, this ratio is based on the total weight of each respective component. In another aspect, the weight ratio of the organoaluminum compound to the activator-support is in a range from about 3:1 to about 1:100, or from about 1:1 to about 1:50.

In some aspects of this invention, the weight ratio of catalyst component I metallocene(s) to activator-support is in a range from about 1:1 to about 1:1,000,000. If more than one metallocene or activator-support is employed, this ratio is based on the total weight of each respective component. In another aspect, this weight ratio is in a range from about 1:5 to about 1:100,000, or from about 1:10 to about 1:10,000. Yet, in another aspect, the weight ratio of the metallocene compound(s) to the activator-support is in a range from about 1:20 to about 1:1000.

In one aspect of this invention, the molar ratio of catalyst component I to catalyst component II in the catalyst composition can be in a range from about 1:1 to about 10,000:1, such as, for example, from about 5:1 to about 10,000:1, from about 15:1 to about 5000:1, from about 25:1 to about 2500:1, from about 30:1 to about 2000:1, from about 35:1 to about 1500:1, or from about 40:1 to about 1000:1. Yet, in another aspect, the molar ratio of catalyst component I to catalyst component II in the catalyst composition ranges from about 50:1 to about 10,000:1, or from about 50:1 to about 1000:1. For instance, the molar ratio of catalyst component I to catalyst component II in the catalyst composition can be in a range from about 50:1 to about 500:1, from about 100:1 to about 500:1, or from about 100:1 to about 250:1. According to still another aspect of the invention, molar ratios of catalyst component I to catalyst component II in the catalyst composition of about 25:1, about 50:1, about 75:1, about 100:1, about 150:1, about 200:1, about 300:1, about 400:1, about 500:1, and about 1000:1, are contemplated herein.

Catalyst compositions of the present invention generally have a catalyst activity greater than about 100 grams of polyethylene (homopolymer, copolymer, etc., as the context requires) per gram of activator-support per hour (abbreviated gP/(gAS·hr)). In another aspect, the catalyst activity is greater than about 150, greater than about 200, or greater than about 250 gP/(gAS·hr). In still another aspect, catalyst compositions of this invention are characterized by having a catalyst activity greater than about 500, greater than about 1000, or greater than about 1500 gP/(gAS·hr). Yet, in another aspect, the catalyst activity is greater than about 2000 gP/(gAS·hr). This activity is measured under slurry polymerization conditions using isobutane as the diluent, at a polymerization temperature of about 90° C. and an ethylene pressure of about 550 psig.

As discussed above, any combination of the metallocene compound and/or hydrogen scavenging catalyst, the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, the metallocene compound and/or the hydrogen scavenging catalyst, the organoaluminum compound, and 1-hexene can be used in a precontacting step for a first period of time, and this precontacted mixture then can be contacted with the activator-support to form a postcontacted mixture that is contacted for a second period of time prior to initiating the polymerization reaction. For example, the first period of time for contact, the precontact time, between any combination of the metallocene compound and/or the hydrogen scavenging catalyst, the olefinic monomer, the activator-support, and the organoaluminum compound can be from about 1 minute to about 24 hours, from about 0.05 hours to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 1 minute to about 24 hours, or from about 0.1 hour to about 1 hour.

Polymerization Process

Catalyst compositions of the present invention can be used to polymerize olefins to form homopolymers, copolymers, terpolymers, and the like. One such process for polymerizing olefins in the presence of a catalyst composition of the present invention comprises contacting the catalyst composition with an olefin monomer and optionally an olefin comonomer under polymerization conditions to produce an olefin polymer, wherein the catalyst composition comprises catalyst component I, catalyst component II, an activator (e.g., an activator-support, an aluminoxane, etc.), and optionally an organoaluminum compound. For instance, catalyst component I can comprise a compound having formula (C), a compound having formula (D), or a combination thereof. Catalyst component II can comprise a hydrogen scavenging catalyst, such as MET-II-A, MET-II-B, MET-II-C, MET-II-D, MET-II-E, MET-II-F, MET-II-G, MET-II-H, or a compound having formula (E), or a combination thereof. The activator can comprise an activator-support, an aluminoxane compound, an organoboron or organoborate compound, an ionizing ionic compound, and the like, or combinations thereof. The activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. The organoaluminum compound can comprise trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In accordance with another aspect of the invention, the polymerization process can employ a catalyst composition comprising only one catalyst component I metallocene compound (e.g., a metallocene compound having formula (C)); only one catalyst component II hydrogen scavenging compound (e.g., MET-II-E or MET-II-F or MET-II-G); at least one activator (e.g., at least one activator-support, at least one aluminoxane, etc.); and optionally, at least one organoaluminum compound.

The catalyst compositions of the present invention are intended for any olefin polymerization method using various types of polymerization reactors. As used herein, "polymerization reactor" includes any polymerization reactor capable of polymerizing olefin monomers and comonomers (one or more than one comonomer) to produce homopolymers, copolymers, terpolymers, and the like. The various types of reactors include those that may be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of unreacted monomer, unreacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series, in parallel, or both.

According to one aspect of the invention, the polymerization reactor system may comprise at least one loop slurry reactor comprising vertical or horizontal loops. Monomer, diluent, catalyst, and comonomer may be continuously fed to a loop reactor where polymerization occurs. Generally, continuous processes may comprise the continuous introduction of monomer/comonomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer/comonomer are contacted with the catalyst composition by suitable stirring or other means. A carrier comprising an inert organic diluent or excess monomer may be employed. If desired, the monomer/comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature may be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally is within a range from about 70° C. to about 90° C., or from about 75° C. to about 85° C.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

According to one aspect of this invention, the concentration of hydrogen in the polymerization process is controlled. In ethylene polymerizations in a continuous loop slurry reactor, reactor hydrogen concentrations in the liquid phase, irrespective of comonomer(s) employed, generally can be controlled at a concentration within a range from 0.1 ppm to about 5000 ppm (by moles), or from about 0.1 ppm to about 1000 ppm, but the specific concentration target can depend upon the desired polymer molecular weight or melt index (MI). For ethylene polymers (homopolymers, copolymers, etc.) having a MI around 1 g/10 min, the reactor hydrogen concentration may be in a range from 0.1 ppm to about 900 ppm (by moles), such as, for example, from about 1 ppm to about 750 ppm, from about 10 ppm to about 500 ppm, from about 10 ppm to about 400 ppm, or from about 10 ppm to about 250 ppm.

It is also contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

Processes of the present invention which utilize a catalyst composition comprising catalyst component I, catalyst component II, an activator (e.g., an activator-support, an aluminoxane, an organoboron compound, etc.), and optionally an organoaluminum compound, can reduce and/or control the level or amount of hydrogen present during the polymerization process (e.g., a continuous polymerization process). It is contemplated that catalyst component II—i.e., comprising a hydrogen scavenging catalyst—has a hydrogen removal activity that is greater than about 5,000 moles of hydrogen ($H_2$) per mole of hydrogen scavenging catalyst per hour (abbreviated $gH_2/(gCat \cdot hr)$). Thus, the hydrogen scavenging catalyst can remove greater than about 5,000 moles of hydrogen from the polymerization process per hour, for each mole of the hydrogen scavenging catalyst present. In another aspect, the hydrogen removal activity is greater than 10,000, greater than about 15,000, greater than about 20,000, or greater than about 25,000 $gH_2/(gCat \cdot hr)$. In still another aspect, the hydrogen scavenging catalyst (one or more than one, if desired) is characterized by having a hydrogen removal activity greater than about 30,000, greater than about 35,000, or greater than about 40,000 $gH_2/(gCat \cdot hr)$. Yet, in another aspect, the hydrogen removal activity is greater than about 50,000, greater than about 75,000, or greater than about 100,000 $gH_2/(gCat \cdot hr)$. In certain aspects, these hydrogen removal activities of the hydrogen scavenging catalyst of catalyst component II can be attained when the catalyst component I metallocene contains an alkenyl moiety, and/or when the olefin polymer produced by the process is an ethylene copolymer having a density in a range from about 0.89 to about 0.93 $g/cm^3$, and/or when the olefin polymer produced by the process is an ethylene copolymer having a melt index in a range from about 0.1 to about 5 g/10 min, or from about 0.5 to about 1.5 g/10 min. As would be recognized by a skilled artisan, the hydrogen removal activity can depend on many polymerization reactor conditions including, but not limited to, the reactor concentration of catalyst component II, the reactor hydrogen concentration, and so forth. This hydrogen removal activity can be measured or determined under continuous slurry polymerization conditions, as illustrated in Examples 75-79 that follow. Alternatively, the hydrogen removal activity of a hydrogen scavenging catalyst can be determined using a batch technique illustrated in Examples 55-74 that follow; specifically, a 1-gallon slurry reactor, 2 L of isobutane, 80° C., 450 psig total reactor pressure, 45 g 1-hexene, 17 mg of hydrogen, 100 mg sulfated alumina, 0.5 mL of 1 M TIBA, 30 min reaction time, and no catalyst component I. For this batch determination of the hydrogen removal activity of a hydrogen scavenging catalyst, 0.5 micromoles of the hydrogen scavenging should be utilized.

In another aspect, the disclosed processes can be methods of removing hydrogen from, or reducing the amount of hydrogen present during, a polymerization process (e.g., a continuous polymerization process). One such method for removing hydrogen from an olefin polymerization process—or, alternatively, for reducing the amount of hydrogen present in an olefin polymerization process—operating in the presence of a catalyst composition, wherein the catalyst composition comprises catalyst component I, an activator (e.g., an aluminoxane, an activator-support, an organoboron compound, etc.), and an optional organoaluminum compound, can comprise the step of introducing catalyst component II, at a molar ratio of catalyst component I to catalyst component II in a range of from about 40:1 to about 1000:1, to the catalyst composition. Alternatively, catalyst component II can be added to the catalyst composition to achieve a molar ratio of catalyst component I to catalyst component II which falls within a range from about 50:1 to about 500:1, or from about 100:1 to about 250:1, for example. These methods of removing hydrogen and/or reducing the amount of hydrogen in a continuous polymerization reactor, in certain aspects, can be employed when the catalyst component I metallocene contains an alkenyl moiety, and/or when the olefin polymer produced by the process is an ethylene copolymer having a density in a range from about 0.89 to about 0.93 g/cm$^3$, and/or when the olefin polymer produced by the process is an ethylene copolymer having a melt index in a range from about 0.1 to about 5 g/10 min, or from about 0.5 to about 1.5 g/10 min.

In another aspect, catalyst component II—i.e., comprising a hydrogen scavenging catalyst—can be employed in a method of transitioning between catalyst systems. For instance, the hydrogen scavenging catalyst can be introduced into a polymerization reactor system that is transitioning from a Ziegler-Natta catalyst system, or from a chromium catalyst system, to a metallocene catalyst system. In such circumstances, the reactor hydrogen ($H_2$) concentration may be reduced from about 0.5-4.0 mole percent to about 100-500 ppm, for example.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

If the resultant polymer produced in accordance with the present invention is, for example, a polymer or copolymer of ethylene, its properties can be characterized by various analytical techniques known and used in the polyolefin industry. Articles of manufacture can be formed from, and/or can comprise, the ethylene polymers of this invention, whose typical properties are provided below.

The processes disclosed herein, utilizing the above-described dual catalyst systems, can reduce and/or control the level or amount or concentration of hydrogen present during the polymerization process, resulting in a polymer having an increased molecular weight, for instance, an increased weight-average molecular weight (Mw) and/or an increased number-average molecular weight (Mn). In some aspects of this invention, the Mw (and/or Mn) of an olefin polymer produced by the process (comprising catalyst component I, catalyst component II, etc.) is at least 10% greater than a Mw (and/or Mn) of an olefin polymer obtained under the same polymerization conditions without catalyst component II. For instance, the Mw (and/or Mn) of the olefin polymer produced by the process can be from about 10% to about 500% greater, from about 15% to about 300% greater, from about 15% to about 200% greater, from about 15% to about 100% greater, from about 15% to about 75% greater, or from about 15% to about 50% greater, than the Mw (and/or Mn) of the olefin polymer obtained under the same polymerization conditions without catalyst component II. In another aspect, the Mw (and/or Mn) of the olefin polymer produced by the process is from about 10% to about 40% greater than the Mw (and/or Mn) of the olefin polymer obtained under the same polymerization conditions without catalyst component II. In accordance with yet another aspect of this invention, these increases in Mw and/or in Mn (e.g., about 10% to about 300%) can be achieved with a molar ratio of catalyst component I to catalyst component II in a range from about 40:1 to about 1000:1, from about 50:1 to about 500:1, or from about 100:1 to about 250:1, for example.

Likewise, lower levels of hydrogen present during the polymerization process can result in a polymer having a lower melt index (MI) and/or a lower high load melt index (HLMI). In one aspect of this invention, the MI and/or HLMI of an olefin polymer produced by the process (comprising catalyst component I, catalyst component II, etc.) is at least 10% less than a MI and/or HLMI of an olefin polymer obtained under the same polymerization conditions without catalyst component II. For instance, the MI and/or HLMI of the olefin polymer produced by the process can be from about 15% to about 95% less, from about 15% to about 90% less, from about 15% to about 80% less, from about 15% to about 70% less, from about 15% to about 60% less, or from about 15% to about 50% less, than the MI and/or HLMI of the olefin polymer obtained under the same polymerization conditions without catalyst component II. In another aspect, the MI and/or HLMI of the olefin polymer produced by the process is from about 20% to about 60% less than the MI and/or HLMI of the olefin polymer obtained under the same polymerization conditions without catalyst component II. In accordance with yet another aspect of this invention, these decreases in MI and/or HLMI (e.g., about 15% to about 95%) can be achieved with a molar ratio of catalyst component I to catalyst component II in a range from about 40:1 to about 1000:1, from about 50:1 to about 1000:1, from about 50:1 to about 500:1, or from about 100:1 to about 250:1, for example.

In certain aspects, these increases in Mw and/or Mn, and/or these decreases in MI and/or HLMI, due to the incorporation of the hydrogen scavenging catalyst of catalyst component II can be attained when the catalyst component I metallocene contains an alkenyl moiety and/or when the olefin polymer produced by the process is an ethylene copolymer having a density in a range from about 0.89 to about 0.93 g/cm$^3$.

In other aspects, the present invention encompasses methods of increasing the Mw and/or Mn, or decreasing the MI and/or HLMI, of an olefin polymer produced by an olefin polymerization process. One such method for increasing the Mw and/or Mn—and/or decreasing the MI and/or HLMI—of an olefin polymer produced by an olefin polymerization process operating in the presence of a catalyst composition, wherein the catalyst composition comprises catalyst component I, an activator (e.g., an activator-support, an aluminoxane, etc.), and an optional organoaluminum compound, can comprise the step of introducing catalyst component II, at a molar ratio of catalyst component I to catalyst component II in a range of from about 40:1 to about 1000:1, to the catalyst composition. Alternatively, catalyst component II can be added to the catalyst composition to achieve a molar ratio of catalyst component I to catalyst component II which falls within a range from about 50:1 to about 500:1, or from about 100:1 to about 250:1, for example. This method for increasing the Mw and/or Mn (and/or decreasing the MI and/or HLMI) of the olefin polymer can increase the Mw and/or Mn of the olefin polymer by about 10% to about 300% (and/or decrease the MI and/or HLMI by about 15% to about 95%), as compared to the Mw and/or Mn (and/or MI and/or HLMI) of the olefin polymer obtained under the same polymerization conditions without catalyst component II.

Generally, the polymers of ethylene (homopolymers, copolymers, terpolymers, etc.) produced in accordance with the processes of this invention have a melt index less than about 20 g/10 min Melt indices in the range from about 0.01 to about 15 g/10 min, or from about 0.1 to about 10 g/10 min, are contemplated in some aspects of this invention. For example, a polymer of the present invention can have a melt index in a range from about 0.1 to about 5, from about 0.25 to about 2, or from about 0.5 to about 1.5 g/10 min.

The density of ethylene-based polymers produced using the catalyst compositions disclosed herein typically falls within the range from about 0.89 to about 0.96 g/cm$^3$, such as, for example, from about 0.89 to about 0.94, or from about 0.89 to about 0.92 g/cm$^3$. In one aspect of this invention, the density of the ethylene polymer is in a range from about 0.90 to about 0.94 g/cm$^3$. Yet, in another aspect, the density is in a range from about 0.91 to about 0.94 g/cm$^3$ or, alternatively, from about 0.91 to about 0.93 g/cm$^3$.

Olefin polymers of this invention may have increased levels of unsaturation. For instance, a polymer produced by a process and catalyst composition of this invention can have an average total polymer unsaturation per chain that falls within a range from about 1.01 to about 100, from about 1.01 to about 75, or from about 1.01 to about 50. The average total polymer unsaturation per chain is the total unsaturation per chain averaged across all polymer chains in the polymer. In some aspects, the average total polymer unsaturation per chain can be in a range from about 1.5 to about 40, from about 1.5 to about 38, from about 1.5 to about 35, from about 1.5 to about 30, from about 2 to about 30, from about 2.25 to about 25, or from about 2.5 to about 20. In other aspects, a polymer of this invention can have an average total unsaturation per chain in a range from about 3 to about 10, such as, for example, from about 3 to about 8, or from about 3 to about 6. Increasing the concentration of component II in the catalyst composition typically can increase the average total unsaturations per chain and the polymer molecular weight.

According to an aspect of this invention, the average total polymer unsaturation per chain of the polymer produced by polymerization processes disclosed herein can be controlled in a range from about from about 1.01 to about 50. For example, in ethylene polymerizations in a continuous loop slurry reactor, the average total polymer unsaturation per chain can be controlled in a range from about 1.5 to about 40; alternatively, from about 2 to about 20; or alternatively, from about 2.5 to about 10. In accordance with some aspects of this invention, these unsaturation levels can be achieved and controlled with a molar ratio of catalyst component I to catalyst component II in a range from about 40:1 to about 1000:1, from about 50:1 to about 1000:1, from about 50:1 to about 500:1, or from about 100:1 to about 250:1, for example.

An illustrative ethylene polymer of this invention can have a melt index less than about 15 g/10 min (e.g., in a range from about 0.01 to about 15 g/10 min), a density in a range from about 0.89 to about 0.96 g/cm$^3$, and an average total polymer unsaturation per chain in a range from about 1.01 to about 50, or from about 1.5 to about 30. Another illustrative ethylene polymer of this invention can have a melt index in a range from about 0.1 to about 10 g/10 min, a density in a range from about 0.89 to about 0.94, and an average total polymer unsaturation per chain in a range from about 2.5 to about 20.

Polymers of ethylene, whether homopolymers, copolymers, terpolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 µL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8× 300 mm) and were calibrated with a broad linear polyethylene standard (Phillips Marlex® BHB 5003) for which the molecular weight had been determined.

Sulfated alumina was formed by a process wherein alumina was chemically-treated with a sulfate or bisulfate source. Such a sulfate or bisulfate source may include, for example, sulfuric acid, ammonium sulfate, or ammonium bisulfate. In an exemplary procedure, a commercial alumina sold as W.R. Grace Alumina A was sulfated by impregnation with an aqueous solution containing about 15-20% $(NH_4)_2SO_4$ or $H_2SO_4$. This sulfated alumina was calcined at 550° C. in air (240° C./hr ramp rate), with a 3 hr hold period at this temperature. Afterward, the sulfated alumina was collected and stored under dry nitrogen, and was used without exposure to the atmosphere.

Examples 1-74 and 80-84 were conducted in a one-gallon stainless steel semi-batch reactor. Isobutane and alkyl aluminum co-catalyst were used in all polymerization experiments. The typical polymerization procedure was conducted as follows: alkyl aluminum (TIBA, triisobutylaluminum), the activator-support (sulfated alumina) and the metallocene were added in order through a charge port while venting isobutane vapor. The charge port was closed and about 2 liters of isobutane were added. The contents of the reactor were stirred and heated to the desired run temperature, and ethylene was then introduced along with the desired amount of 1-hexene. Ethylene was fed on demand to maintain the specified pressure for the specified length of the polymerization run. The reactor was maintained and controlled at the desired run temperature throughout the polymerization. Upon completion, or at a desired time during the run, the ethylene flow was stopped and a sample of the reactor vapor phase was removed. Thereafter, the reactor pressure was slowly vented off. Alternatively, ethylene flow was again introduced into the reactor and the reaction was allowed to run additional time until the end of the reaction and the aforementioned vent off. The reactor was opened and the polymer product was collected and dried under vacuum at approximately 50° C. for at least two hours.

Examples 1-2

Hydrogen Generated by Ethylene Feedstock and Sulfated Alumina and TIBA

The conditions employed were a reaction temperature of 95° C., 340 psig ethylene feed, 2 L of isobutane, 100 mg sulfated alumina, 0.5-1.0 mg of the metallocene, and 0.5 mL of 1 M TIBA. Calculations based on these conditions led to an estimated initial vapor volume of 1.27 L and a liquid volume of 2.5 L (for the 1-gallon reaction vessel). Using this information, the reactor vapor sample, and a calibrated micro-GC capable of detecting small levels of hydrogen in the vapor space of the reactor, the mole ppm level of hydrogen in the reactor can be determined.

In Example 1, no metallocene, sulfated alumina, or TIBA was charged to the reactor. The amount of hydrogen observed in the vapor phase sample was analyzed to be about 6 ppm at the 340 psig pressure.

In Example 2, no metallocene was charged to the reactor. The amount of hydrogen due to sulfated alumina and TIBA was determined to be about 13 ppm.

Examples 3-9

Hydrogen Generated by MET-I-A and Dinuclear DMET-I-A in Olefin Polymerization Under the conditions of Example 1, the polymerizations of Examples 3-9 utilized either 0.5 mg of MET-I-A or 1 mg of DMET-I-A, and the reaction times and amount of 1-hexene comonomer listed in Table I. Dinuclear DMET-I-A, a homodinuclear compound derived from MET-I-A, can be prepared in accordance with the procedure described in U.S. Patent Publication No. 2009-0170690, which is incorporated herein by reference in its entirety.

In these Examples, hydrogen was generated even with no 1-hexene comonomer present, but higher levels of hydrogen were generated when the comonomer was present, and when reaction time was increased. Under comparable conditions, there was less hydrogen generation with DMET-I-A than with MET-I-A.

TABLE I

Hydrogen generation of Examples 3-9.

| Example | Catalyst | Reaction Time (min) | 1-hexene (g) | Hydrogen (ppm) |
|---|---|---|---|---|
| 3 | MET-I-A | 60 | 0 | 213 |
| 4 | MET-I-A | 60 | 5 | 287 |
| 5 | MET-I-A | 120 | 0 | 297 |
| 6 | MET-I-A | 140 | 5 | 370 |
| 7 | DMET-I-A | 60 | 0 | 30 |
| 8 | DMET-I-A | 60 | 5 | 36 |
| 9 | DMET-I-A | 60 | 10 | 47 |

Examples 10-23

Hydrogen Generated by MET-I-B, MET-II-A, and Dual Catalyst Using MET-I-B and MET-II-A in Olefin Polymerization Under the conditions of Example 1, the polymerizations of Examples 10-23 utilized 1 mg of MET-I-B, 1 mg of MET-II-A, or 1 mg total of the dual catalyst (0.5 mg each of MET-I-B and MET-II-A). Table II lists the ppm hydrogen generated for each catalyst system after a 1-hour reaction time at specific 1-hexene comonomer loadings. Interestingly, the hydrogen generated by the dual catalyst system seemed to track closely with that of the MET-II-A catalyst, and not with the MET-I-B catalyst.

TABLE II

Hydrogen generation of Examples 10-23.

| Example | Catalyst | 1-hexene (g) | Hydrogen (ppm) |
|---|---|---|---|
| 10 | MET-I-B | 0 | 197 |
| 11 | MET-I-B | 5 | 226 |
| 12 | MET-I-B | 10 | 254 |
| 13 | MET-II-A | 0 | 30 |
| 14 | MET-II-A | 5 | 38 |
| 15 | MET-II-A | 10 | 45 |
| 16 | MET-II-A | 20 | 57 |
| 17 | MET-II-A | 40 | 75 |
| 18 | MET-II-A | 80 | 94 |
| 19 | DUAL | 0 | 61 |
| 20 | DUAL | 5 | 80 |
| 21 | DUAL | 10 | 80 |
| 22 | DUAL | 20 | 100 |
| 23 | DUAL | 40 | 143 |

Examples 24-34

Hydrogen Generated by MET-I-A and Dual Catalysts Using MET-I-A and Either MET-II-A or MET-II-D in Olefin Polymerization Under the conditions of Examples 10-23, the polymerizations of Examples 24-34 utilized 0.5 mg of MET-I-A and either 0.5 mg of MET-II-A or 0.25 mg of MET-II-D. Table III lists the ppm hydrogen generated for each catalyst system after a 1-hour reaction time at specific 1-hexene comonomer loadings. Both MET-II-A and MET-II-D in dual catalyst systems reduced the hydrogen generated, as compared to MET-I-A alone.

TABLE III

Hydrogen generation of Examples 24-34.

| Example | 1st Catalyst | 2nd Catalyst | 1-hexene (g) | Hydrogen (ppm) |
|---|---|---|---|---|
| 24 | MET-I-A | — | 0 | 213 |
| 25 | MET-I-A | — | 5 | 287 |
| 26 | MET-I-A | — | 10 | 207 |
| 27 | MET-I-A | MET-II-A | 0 | 78 |
| 28 | MET-I-A | MET-II-A | 5 | 76 |
| 29 | MET-I-A | MET-II-A | 10 | 97 |

TABLE III-continued

Hydrogen generation of Examples 24-34.

| Example | 1st Catalyst | 2nd Catalyst | 1-hexene (g) | Hydrogen (ppm) |
|---|---|---|---|---|
| 30 | MET-I-A | MET-II-A | 20 | 108 |
| 31 | MET-I-A | MET-II-D | 0 | 78 |
| 32 | MET-I-A | MET-II-D | 5 | 83 |
| 33 | MET-I-A | MET-II-D | 10 | 134 |
| 34 | MET-I-A | MET-II-D | 20 | 159 |

Examples 35-54

Hydrogen Consumed by MET-I-A and Dual Catalysts Using MET-I-A and other 2nd Catalysts in Olefin Polymerization Examples 35-54 utilized substantially the same conditions as that of Example 1, except that 4.2 micromoles of MET-I-A and 45 g of 1-hexene were used at a polymerization temperature of 80° C., 450 psig ethylene, and a reaction time of 30 minutes. No effort was made to increase or to maximize the production of polymer in Examples 35-54. For Examples 38-54, approximately 17 mg of hydrogen were added to the reactor prior to polymerization (the approximate 17 mg addition of hydrogen resulted in approximately 1800 ppm of hydrogen in the vapor phase). A different reactor was used for Examples 42-44, but the same polymerization conditions used in Examples 38-41 and 45-54 were employed. Table IV lists the final ppm hydrogen vapor concentration after 30 minutes at the specified conditions, amount of polymer produced, and/or the MI, HLMI, or Mw of the polymer produced.

The 2nd catalyst can be used to control the level of hydrogen during the polymerization and, accordingly, the polymer MI (or HLMI) and/or molecular weight. Generally, the lower the hydrogen concentration, the lower the polymer MI (or HLMI), assuming the same initial starting hydrogen concentration.

TABLE IV

Summary of Examples 35-54.

| Example | 2nd Catalyst | Catalyst 2 (micromole) | Hydrogen (ppm) | MI | HLMI | Mw/1000 | Polymer (g) |
|---|---|---|---|---|---|---|---|
| 35 | — | 0 | 175 | 0.06 | 2.59 | 203 | 404 |
| 36 | MET-II-F | 0.4 | 53 | — | 0.26 | 316 | 323 |
| 37 | MET-II-F | 4 | 1 | — | 0.07 | 440 | 98 |
| 38 | — | 0 | — | 1.10 | 19.7 | 123 | 237 |
| 39 | MET-II-E | 0.06 | — | 0.25 | 5.1 | 174 | 181 |
| 40 | MET-II-E | 0.4 | — | — | 0.20 | 437 | 104 |
| 41 | MET-II-E | 4 | — | — | 0.13 | 484 | 64 |
| 42 | — | 0 | 483 | 1.23 | 20.6 | — | 468 |
| 43 | MET-II-E | 0.4 | 40 | — | 0.53 | — | 223 |
| 44 | MET-II-F | 0.4 | 78 | — | 0.46 | — | 93 |
| 45 | Zr(NMe$_2$)$_4$ | 4 | 2321 | 0.57 | 15.6 | — | 49 |
| 46 | Ti(NMe$_2$)$_4$ | 4 | 1296 | 0.95 | 16.9 | — | 157 |
| 47 | Ti(NMe$_2$)$_4$ | 4 | 712 | 0.92 | 17.7 | — | 150 |
| 48 | (nBuCp)$_2$TiCl$_2$ | 4 | 3 | — | — | — | 38 |
| 49 | (nBuCp)$_2$TiCl$_2$ | 1 | 16 | — | 0.05 | — | 89 |
| 50 | Pd/C | 2.4 | 17 | — | — | — | 409 |
| 51 | Pd/C | 2.2 | 45 | — | — | — | 262 |
| 52 | Cp$_2$(CO)$_2$ | 0.17 | 504 | 0.17 | 4.5 | — | 227 |
| 53 | Cp$_2$(CO)$_2$ | 0.43 | 178 | 0.03 | 2.2 | — | 330 |
| 54 | Cp$_2$(CO)$_2$ | 0.17 | 121 | — | 1.1 | — | 143 |

Notes on Table IV:
Examples 48-49 and 51-52 utilized 1.7 micromoles of MET-I-A.
The 2nd catalyst in Examples 50-51 was Pd, 10 wt % on activated carbon; these polymerizations were conducted for 60 min.

Examples 55-74

Hydrogen Consumption by Various 2nd Catalysts

Examples 55-74 utilized substantially the same conditions as that of Examples 38-41 and 45-54, except that no 1st catalyst was employed. The approximate 17 mg addition of hydrogen resulted in approximately 1800 ppm of hydrogen in the vapor phase. Table V lists the ppm hydrogen remaining (hydrogen concentration) after 30 minutes at the specified conditions. The results confirm that several catalysts are effective at reducing the hydrogen concentration in the reactor, and are compatible with an alkyl aluminum (e.g., TIBA) and an activator-support (e.g., sulfated alumina).

TABLE V

Hydrogen consumption of Examples 55-74.

| Example | 2nd Catalyst | Catalyst 2 (micromole) | Hydrogen (ppm) |
|---|---|---|---|
| 55 | MET-II-F | 4 | <1 |
| 56 | MET-II-G | 4 | 13 |
| 57 | MET-II-H | 4.4 | 78 |
| 58 | Ti(nBuO)$_4$ | 4 | 1040 |
| 59 | (Ph$_3$P)$_2$NiBr$_2$ | 4 | 1394 |
| 60 | C$_{43}$H$_{65}$Cl$_2$N$_2$PRu | 4 | 1525 |

TABLE V-continued

Hydrogen consumption of Examples 55-74.

| Example | 2nd Catalyst | Catalyst 2 (micromole) | Hydrogen (ppm) |
|---|---|---|---|
| 61 | Zr(NMe$_2$)$_4$ | 4 | 486 |
| 62 | Zr(O-i-Pr)$_4$•HO-i-Pr | 4 | 2100 |
| 63 | Fe(III)(acetoacetonate)$_3$ | 4 | 1870 |
| 64 | Ni(II)(acetoacetonate)$_2$ | 4 | 1898 |
| 65 | Troymax 6 (zirconylcarboxylate) | 4 | 1690 |
| 66 | Ti(NMe$_2$)$_4$ | 4 | 1365 |
| 67 | Cp*$_2$TiCl$_2$ | 4 | 344 |
| 68 | (n-BuCp)$_2$TiCl$_2$ | 4 | 5 |
| 69 | CpNbCl$_4$ | 4 | 1280 |
| 70 | [Me$_4$CpSiMe$_2$N-t-Bu]TiCl$_2$ | 4 | 1283 |
| 71 | Cp$_2$Cr | 4 | 1769 |
| 72 | Cp*$_2$TiCl$_2$ | 1 | 1283 |
| 73 | (n-BuCp)$_2$TiCl$_2$ | 1 | 73 |
| 74 | Cp$_2$Ti(CO)$_2$ | 4.3 | <1 |

Note on Table V:
The 2nd catalyst in Example 60 was the Grubbs 1st Generation Metathesis Catalyst.
The 2nd catalyst in Examples 67 and 72 was bis-(pentamethylcyclopentadienyl) titanium dichloride.

Examples 75-79

Olefin Polymerization Runs with MET-I-A and MET-I-A+MET-II-F

The polymerization runs of Examples 75-79 were conducted in a loop reactor as follows. A 31.2-gallon (118 L) slurry loop reactor was employed as the polymerization reactor. Polymerization runs were carried out under continuous particle form process conditions in the loop reactor (also known as a slurry process) by contacting a 1-hexene solution of the MET-I-A with triisobutylaluminum (TIBA) and a sulfated alumina activator-support in a 300, 500 or 1000-mL stirred autoclave with continuous output to the loop reactor while feeding the MET-II-F directly to the reactor, bypassing the precontactor.

Precontacting was carried out in the following manner. A TIBA solution in isobutane and the MET-I-A solution in 1-hexene were fed as separate streams into a manifold upstream of the activator-support feeder outlet where they contacted each other and were combined with isobutane flush. The activator-support was flushed with the combined solution into the autoclave, briefly contacting the TIBA/metallocene just before entering the autoclave. The combined solution flush used to transport the activator-support into the autoclave was set at a rate that would result in a residence time of approximately 15-30 minutes in the autoclave, controlled by adjusting the isobutane flow rate. The total flow from the autoclave then entered the loop reactor. The second metallocene (MET-II-F) solution in isobutane, used for hydrogen and melt index control, was treated with 10 equivalents of TIBA and fed directly to the reactor.

Ethylene used was polymerization grade ethylene (obtained from AirGas Specialty Gases) which was purified through a column of A201 alumina and activated at 343° C. in nitrogen. 1-Hexene used was polymerization grade 1-hexene (obtained from Chevron Phillips Chemical Company), which was further purified by distillation and subsequently passed through a column of AZ300, an alumina molecular sieve hybrid, and activated at 343° C. in nitrogen. The loop reactor was a liquid-full, 15.2-cm diameter, loop reactor, having a volume of 31.2 gallons (118 L). Liquid isobutane was used as the diluent. Hydrogen was added at a controlled rate based on the ethylene feed rate. The isobutane was polymerization grade isobutane (obtained from Enterprise Products) that was further purified by distillation and subsequently passed through a column of 13× molecular sieves and activated at 343° C. in nitrogen.

Reactor pressure was approximately 590 psig. The reaction temperatures employed are listed in Table VI. Additionally, the reactor was operated to have a residence time of about 1.1 to 1.2 hours. The activator-support was added through a 0.35-mL circulating ball-check feeder and fed to the 300, 500 or 1000-mL autoclave as described above. MET-I-A concentrations in the reactor were within a range of about 2.7-3.4 parts per million (ppm) of the diluent in the polymerization reactor. MET-II-F concentrations in the reactor were within a range of about 0.01 to 0.03 ppm of the diluents in the polymerization reactor. Polymer was removed from the reactor at the rates indicated in Table VI and recovered in a flash chamber. A purge column was used to dry the polymer under nitrogen at about 60-80° C.

TIBA concentration in the reactor was in a range of about 40-50 ppm of the diluent in the polymerization reactor, as listed in Table VI. About one-half of the TIBA was added to the autoclave and the remainder fed directly to the reactor. To prevent static build-up in the reactor, a small amount (less than 5 ppm based on the weight of diluent) of a commercial antistatic agent, such as Octastat 3000, was added as needed. The polymerization conditions and resultant polymer properties for Examples 75-79 are listed in Table VI. No effort was made to increase or to maximize the production of polymer in Examples 75-79.

The addition of MET-II-F—even at very low molar ratios—resulted in a substantial decrease in polymer melt index (MI), in the 35-55% range. Additionally, the addition of MET-II-F resulted in increases in the Mw (12-18%) and in the Mn of the polymer produced. These polymers properties are summarized in Table VI; see Examples 77 and 79 versus Examples 76 and 78.

The hydrogen removal activity of MET-II-F in a continuous polymerization process also can be determined by comparing Examples 76 and 77, and by comparing Examples 78 and 79. The hydrogen removal activity of MET-II-F in Example 77 was approximately 64,000 moles of hydrogen per mole of MET-II-F per hour (i.e., 64,000 moles of hydrogen were removed per mole of MET-II-F per hour). Similarly, the hydrogen removal activity of MET-II-F in Example 79 was approximately 46,700 moles of hydrogen per mole of MET-II-F per hour (i.e., 46,700 moles of hydrogen were removed per mole of MET-II-F per hour).

TABLE VI

Polymerization conditions and polymer properties of Examples 75-79.

| | Example | | | | |
|---|---|---|---|---|---|
| | 75 | 76 | 77 | 78 | 79 |
| Activator-Support | Sulfated Alumina | Sulfated Alumina | Sulfated Alumina | Sulfated Alumina | Sulfated Alumina |

TABLE VI-continued

Polymerization conditions and polymer properties of Examples 75-79.

| | Example | | | | |
|---|---|---|---|---|---|
| | 75 | 76 | 77 | 78 | 79 |
| MET-I-A to Reactor (ppm) | 2.76 | 2.80 | 2.90 | 3.34 | 2.94 |
| MET-II-F to Reactor (ppm) | 0 | 0 | 0.025 | 0 | 0.012 |
| MET-I-A:MET-II-F Molar Ratio | — | — | 50:1 | — | 105:1 |
| Autoclave Residence Time(min) | 17.2 | 15.6 | 15.9 | 15.5 | 15.1 |
| Co-catalyst Type | TIBA | TIBA | TIBA | TIBA | TIBA |
| Co-catalyst in reactor (ppm) | 45.4 | 48.9 | 43.8 | 41.4 | 47.7 |
| Rx Temp (° F.) | 170.7 | 170.8 | 170.7 | 170.8 | 171.3 |
| Ethylene (mol %) | 10.2 | 9.8 | 10.1 | 10.0 | 9.7 |
| 1-hexene (mol %) | 1.66 | 1.64 | 1.62 | 1.56 | 1.59 |
| Hydrogen (mol %) | 0.012 | 0.019 | 0.013 | 0.014 | 0.012 |
| Hydrogen Feed Rate (mlb/hr) | 0.53 | 1.81 | 1.81 | 1.35 | 1.35 |
| Ethylene Feed Rate (lb/hr) | 48.0 | 43.7 | 43.7 | 43.7 | 43.7 |
| 1-Hexene Feed Rate (lb/hr) | 6.5 | 5.9 | 5.6 | 5.7 | 5.8 |
| Total Isobutane Flow Rate (lb/hr) | 68.9 | 68.1 | 68.1 | 68.2 | 68.1 |
| Solids Concentration. Wt. % | 41.1 | 38.7 | 39.0 | 38.1 | 38.4 |
| Polymer Production (lb/hr) | 51.2 | 46.0 | 46.3 | 45.3 | 45.7 |
| Density (pellets) (g/cc) | 0.9129 | — | 0.9214 | — | — |
| Density (fluff) (g/cc) | 0.9117 | 0.9145 | 0.9122 | 0.9148 | 0.9119 |
| HLMI (pellets) | 25.1 | — | 22.0 | — | 20.7 |
| MI (pellets) | 1.0 | — | 1.1 | — | 1.1 |
| HLMI (fluff) | 15.6 | 34.4 | 19.1 | 28.4 | 17.7 |
| MI (fluff) | 1.0 | 2.5 | 1.1 | 1.7 | 1.1 |
| Mn/1000 | 52.2 | 43.7 | 48.4 | 47.8 | 49.5 |
| Mw/1000 | 127.7 | 101.8 | 120.7 | 107.9 | 121.5 |
| Mw/Mn | 2.44 | 2.34 | 2.50 | 2.26 | 2.45 |

Examples 80-84

Unsaturation in Polymers Produced Using MET-I-A and MET-I-A+MET-II-F

Examples 80-84 utilized substantially the same conditions as that of Examples 35-37. About 2.5 micromoles of MET-I-A (1st catalyst) were used. The 2nd catalyst was MET-II-F. Table VII lists Mn (number-average molecular weight) and 1H-NMR analysis for the polymers of Examples 80-84. The addition of MET-II-F dramatically increased the molecular weight, as compared to the polymer produced by MET-I-A alone. Interestingly, the addition of MET-II-F also changed the polymer architecture, e.g., increasing levels of polymer unsaturation.

The addition of MET-II-F significantly increased the internal olefinic unsaturation (e.g., cis and trans). Average total polymer unsaturation per chain increased from about 1.2 to the range of 3-5. Internal unsaturation per chain increased to 2-3, and above, double bonds per chain, as compared to about 0.7 for the polymer produced using MET-I-A alone.

TABLE VII

Summary of Examples 80-84.

| Example | Catalyst 2 (micromole) | Vinyl | Vinylidene | Cis | Trans | E(Me) | Z(Me) |
|---|---|---|---|---|---|---|---|
| 80 | 0 | 0.047 | 0.025 | 0.007 | 0.042 | 0.005 | 0.045 |
| 81 | 1.0 | 0.086 | 0.030 | 0.029 | 0.069 | 0.085 | 0.074 |
| 82 | 0.1 | 0.073 | 0.020 | 0.021 | 0.057 | 0.055 | 0.083 |
| 83 | 0.25 | 0.036 | 0.023 | 0.018 | 0.074 | 0.065 | 0.036 |
| 84 | 0 | 0.064 | 0.027 | 0.004 | 0.025 | 0.064 | 0.028 |

| Example | Catalyst 2 (micromole) | Total Internal | Total Olefins | Percent Internal | Mn | Total UPC | Internal UPC |
|---|---|---|---|---|---|---|---|
| 80 | 0 | 0.099 | 0.171 | 57.9 | 98,300 | 1.20 | 0.70 |
| 81 | 1.0 | 0.257 | 0.373 | 68.9 | 178,100 | 4.74 | 3.27 |

TABLE VII-continued

Summary of Examples 80-84.

| 82 | 0.1 | 0.216 | 0.309 | 69.9 | 142,100 | 3.14 | 2.19 |
| 83 | 0.25 | 0.193 | 0.252 | 76.6 | 174,700 | 3.14 | 2.41 |
| 84 | 0 | 0.121 | 0.212 | 57.1 | 77,000 | 1.17 | 0.67 |

Notes on Table VII:
1H-NMR data for vinyl, vinylidene, cis, trans, E(Me), Z(Me), total internal, and total olefins are per 1000 carbon atoms.
Total UPC and internal UPC are average unsaturation per chain.

We claim:

1. An olefin polymerization process, the process comprising:
contacting a catalyst composition with an olefin monomer and optionally an olefin comonomer under polymerization conditions to produce an olefin polymer, wherein the catalyst composition comprises catalyst component I, catalyst component II, an activator-support, and an organoaluminum compound, wherein:
catalyst component I comprises a metallocene compound;
catalyst component II comprises a hydrogen scavenging catalyst; and
a molar ratio of catalyst component I to catalyst component II in the catalyst composition is in a range from about 40:1 to about 10,000:1.

2. The process of claim 1, wherein catalyst component I comprises:
a compound having formula (C);
a compound having formula (D); or
any combination thereof, wherein:
formula (C) is

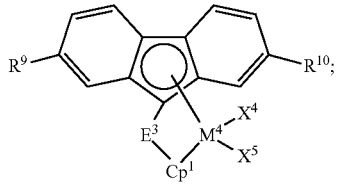

wherein:
$M^3$ is Zr or Hf;
$X^4$ and $X^5$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;
$E^3$ is a bridging group selected from:
a cyclic or heterocyclic bridging group having up to 18 carbon atoms,
a bridging group having the formula $>E^{3A}R^{7A}R^{8A}$, wherein $E^{3A}$ is C or Si, and $R^{7A}$ and $R^{8A}$ are independently H or a hydrocarbyl group having up to 18 carbon atoms,
a bridging group having the formula $—CR^{7B}R^{8B}—CR^{7C}R^{8C}—$, wherein $R^{7B}$, $R^{8B}$, $R^{7C}$, and $R^{8C}$ are independently H or a hydrocarbyl group having up to 10 carbon atoms, or
a bridging group having the formula $—SiR^{7D}R^{8D}—SiR^{7E}R^{8E}—$, wherein $R^{7D}$, $R^{8D}$, $R^{7E}$, and $R^{8E}$ are independently H or a hydrocarbyl group having up to 10 carbon atoms;

$R^9$ and $R^{10}$ are independently H or a hydrocarbyl group having up to 18 carbon atoms; and
$Cp^1$ is a cyclopentadienyl or indenyl group, any substituent on $Cp^1$ is H or a hydrocarbyl or hydrocarbylsilyl group having up to 18 carbon atoms; and
formula (D) is

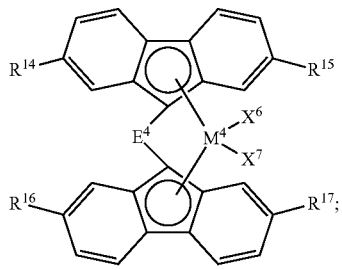

wherein:
$M^4$ is Zr or Hf;
$X^6$ and $X^7$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;
$E^4$ is a bridging group selected from:
a cyclic or heterocyclic bridging group having up to 18 carbon atoms,
a bridging group having the formula $>E^{4A}R^{12A}R^{13A}$, wherein $E^{4A}$ is C or Si, and $R^{12A}$ and $R^{13A}$ are independently H or a hydrocarbyl group having up to 18 carbon atoms,
a bridging group having the formula $—CR^{12B}R^{13B}—CR^{12C}R^{13C}—$, wherein $R^{12B}$, $R^{13B}$, $R^{12C}$, and $R^{13C}$ are independently H or a hydrocarbyl group having up to 10 carbon atoms, or
a bridging group having the formula $—SiR^{12D}R^{13D}—SiR^{12E}R^{13E}—$, wherein $R^{12D}$, $R^{13D}$, $R^{12E}$, and $R^{13E}$ are independently H or a hydrocarbyl group having up to 10 carbon atoms; and
$R^{14}$, $R^{15}$, $R^{16}$, and $R^{17}$ are independently H or a hydrocarbyl group having up to 18 carbon atoms.

3. The process of claim 1, wherein the hydrogen scavenging catalyst comprises Ru, Rh, Pt, Pd, Fe, Ni, Nb, Ti, or a combination thereof.

4. The process of claim 1, wherein catalyst component II comprises:

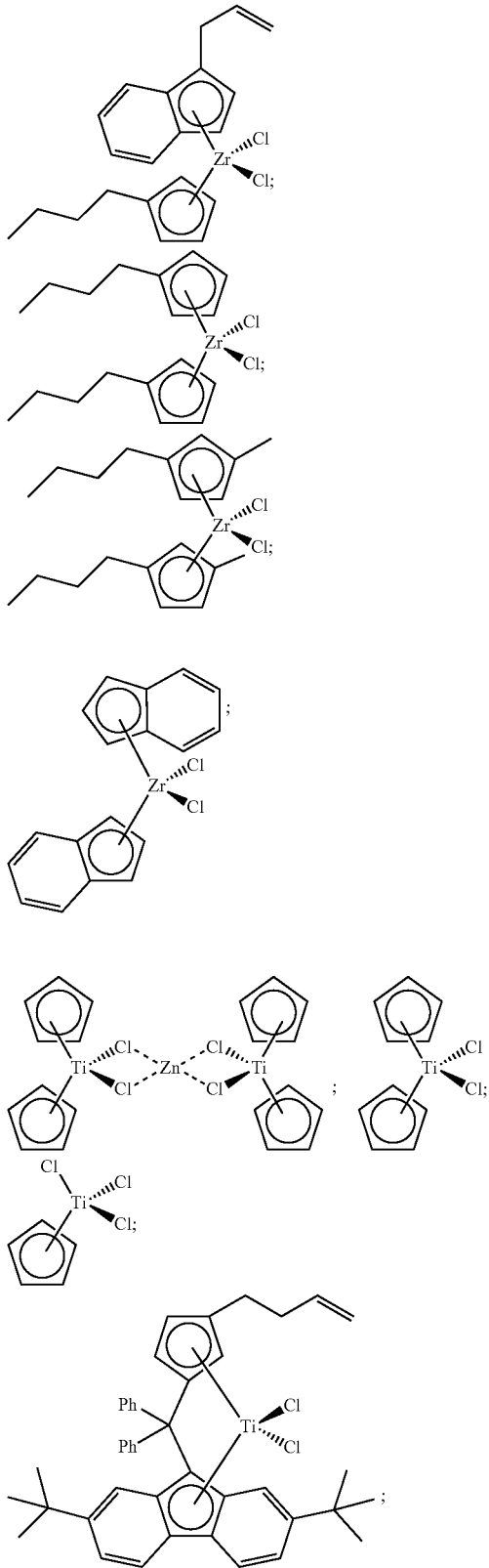

a compound having the formula

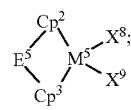

(E)

or any combination thereof, wherein:
M⁵ is Zr or Hf;
X⁸ and X⁹ are independently F; Cl; Br; I; methyl; benzyl; phenyl; H; BH₄; OBR₂ or SO₃R, wherein R is an alkyl or aryl group having up to 18 carbon atoms; or a hydrocarbyloxide group, a hydrocarbylamino group, or a hydrocarbylsilyl group, any of which having up to 18 carbon atoms;
Cp² and Cp³ are independently a cyclopentadienyl or indenyl, any substituent on Cp² and Cp³ is independently H or a hydrocarbyl group having up to 18 carbon atoms; and
E⁵ is a bridging group having the formula —(CH₂)ₙ—, wherein n is an integer from 2 to 8, inclusive.

5. The process of claim 1, wherein the molar ratio of catalyst component I to catalyst component II in the catalyst composition is in a range from about 50:1 to about 1000:1.

6. The process of claim 1, wherein the hydrogen scavenging catalyst has a hydrogen removal activity greater than about 5,000 moles of hydrogen (H₂) per mole of the hydrogen scavenging catalyst per hour.

7. The process of claim 1, wherein:
a weight-average molecular weight (Mw) of the olefin polymer produced by the process is from about 10% to about 500% greater than a weight-average molecular weight (Mw) of an olefin polymer obtained under the same polymerization conditions without catalyst component II; or
a melt index (MI) of the olefin polymer produced by the process is from about 15% to about 95% less than a MI of an olefin polymer obtained under the same polymerization conditions without catalyst component II; or
a high load melt index (HLMI) of the olefin polymer produced by the process is from about 15% to about 95% less than a HLMI of an olefin polymer obtained under the same polymerization conditions without catalyst component II; or
any combination thereof.

8. The process of claim 1, wherein:
a melt index of the olefin polymer produced by the process is in a range from about 0.1 to about 5 g/10 min; or
a density of the olefin polymer produced by the process is in a range from about 0.89 to about 0.96 g/cm³; or
an average total polymer unsaturation per chain of the olefin polymer produced by the process is in a range from about 1.01 to about 50; or
any combination thereof.

9. The process of claim 1, wherein an average total polymer unsaturation per chain of the polymer produced by the process is in a range from about 1.5 to about 20.

10. The process of claim 1, wherein the polymerization process is conducted in the presence of hydrogen at a liquid phase hydrogen concentration in a range from about 0.1 ppm to about 5000 ppm.

11. The process of claim 1, wherein the activator-support comprises a solid oxide treated with an electron-withdrawing anion, wherein:

the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, or any combination thereof.

12. The process of claim 1, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

13. The process of claim 1, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

14. The process of claim 1, wherein the catalyst composition further comprises an aluminoxane compound, an organoboron or organoborate compound, an ionizing ionic compound, or any combination thereof.

15. The process of claim 1, wherein the process is conducted in a batch reactor, slurry reactor, gas-phase reactor, solution reactor, high pressure reactor, tubular reactor, autoclave reactor, or a combination thereof.

16. The process of claim 1, wherein the olefin monomer is ethylene, and the olefin comonomer comprises propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

17. A catalyst composition comprising catalyst component I, catalyst component II, and an activator, wherein:
catalyst component I comprises a metallocene compound;
catalyst component II comprises a hydrogen scavenging catalyst; and
a molar ratio of catalyst component I to catalyst component II in the catalyst composition is in a range from about 40:1 to about 10,000:1, and wherein:
catalyst component I comprises:
a compound having formula (C);
a compound having formula (D); or
any combination thereof, wherein:
formula (C) is

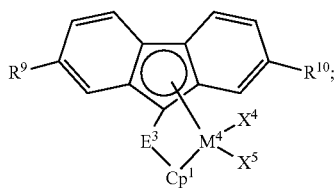

wherein:
$M^3$ is Zr or Hf;
$X^4$ and $X^5$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$E^3$ is a bridging group selected from:
a cyclic or heterocyclic bridging group having up to 18 carbon atoms,
a bridging group having the formula $>E^{3A}R^{7A}R^{8A}$, wherein $E^{3A}$ is C or Si, and $R^{7A}$ and $R^{8A}$ are independently H or a hydrocarbyl group having up to 18 carbon atoms,
a bridging group having the formula $-CR^{7B}R^{8B}-CR^{7C}R^{8C}-$, wherein $R^{7B}$, $R^{8B}$, $R^{7C}$, and $R^{8C}$ are independently H or a hydrocarbyl group having up to 10 carbon atoms, or
a bridging group having the formula $-SiR^{7D}R^{8D}SiR^{7E}R^{8E}-$, wherein $R^{7D}$, $R^{8D}$, $R^{7E}$, and $R^{8E}$ are independently H or a hydrocarbyl group having up to 10 carbon atoms;

$R^9$ and $R^{10}$ are independently H or a hydrocarbyl group having up to 18 carbon atoms; and $Cp^1$ is a cyclopentadienyl or indenyl group, any substituent on $Cp^1$ is H or a hydrocarbyl or hydrocarbylsilyl group having up to 18 carbon atoms; and formula (D) is

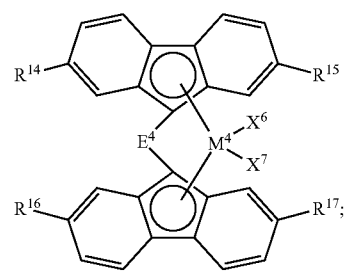

wherein:
$M^4$ is Zr or Hf;
$X^6$ and $X^7$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$E^4$ is a bridging group selected from:
a cyclic or heterocyclic bridging group having up to 18 carbon atoms,
a bridging group having the formula $>E^{4A}R^{12A}R^{13A}$, wherein $E^{4A}$ is C or Si, and $R^{12A}$ and $R^{13A}$ are independently H or a hydrocarbyl group having up to 18 carbon atoms,
a bridging group having the formula $-CR^{12B}R^{13B}-CR^{12C}R^{13C}-$, wherein $R^{12B}$, $R^{13B}$, $R^{12C}$, and $R^{13C}$ are independently H or a hydrocarbyl group having up to 10 carbon atoms, or
a bridging group having the formula $-SiR^{12D}R^{13D}-SiR^{12E}R^{13E}-$, wherein $R^{12D}$, $R^{13D}$, $R^{12E}$, and $R^{13E}$ are independently H or a hydrocarbyl group having up to 10 carbon atoms; and $R^{14}$, $R^{15}$, $R^{16}$, and $R^{17}$ are independently H or a hydrocarbyl group having up to 18 carbon atoms;
catalyst component II comprises:

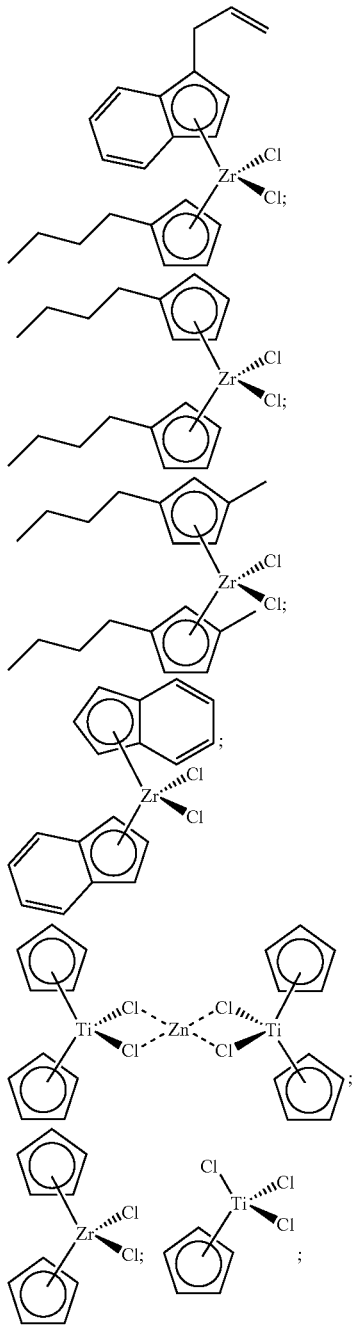

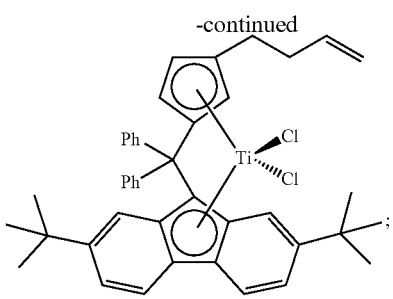

a compound having the formula

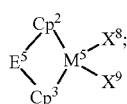

(E)

or any combination thereof, wherein:
$M^5$ is Zr or Hf;

$X^8$ and $X^9$ are independently F; Cl; Br; I; methyl; benzyl; phenyl; H; $BH_4$; $OBR_2$ or $SO_3R$, wherein R is an alkyl or aryl group having up to 18 carbon atoms; or a hydrocarbyloxide group, a hydrocarbylamino group, or a hydrocarbylsilyl group, any of which having up to 18 carbon atoms;

$Cp^2$ and $Cp^3$ are independently a cyclopentadienyl or indenyl, any substituent on $Cp^2$ and $Cp^3$ is independently H or a hydrocarbyl group having up to 18 carbon atoms; and $E^5$ is a bridging group having the formula $-(CH_2)_n-$, wherein n is an integer from 2 to 8, inclusive; and the activator comprises an activator-support, an aluminoxane compound, an organoboron or organoborate compound, an ionizing ionic compound, or any combination thereof.

18. An olefin polymerization process comprising contacting the catalyst composition of claim 17 with an olefin monomer and optionally an olefin comonomer under polymerization conditions to produce an olefin polymer.

\* \* \* \* \*

UNITED STATES PATENT AND TRADEMARK OFFICE
CERTIFICATE OF CORRECTION

PATENT NO. : 8,207,280 B2
APPLICATION NO. : 12/824491
DATED : June 26, 2012
INVENTOR(S) : Murray et al.

Page 1 of 1

It is certified that error appears in the above-identified patent and that said Letters Patent is hereby corrected as shown below:

IN THE CLAIMS:

Column 81, lines 35-43:   The chemical structure should be deleted and replaced with:

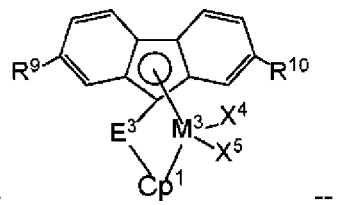

Column 85, lines 53-62:   The chemical structure should be deleted and replaced with:

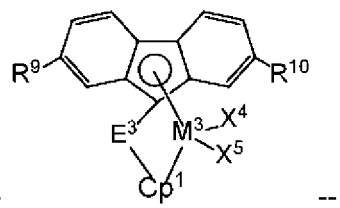

Column 87, line 1:   "$R^{14}_9R^{15}$," should be changed to --$R^{14}$, $R^{15}$,--

Column 87, lines 48-52:   The chemical structures should be deleted and replaced with:

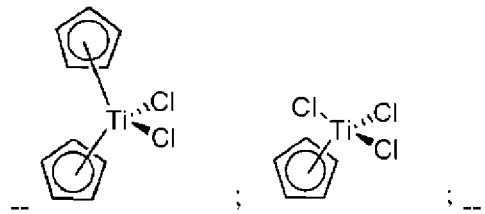

Signed and Sealed this
Twenty-second Day of March, 2016

Michelle K. Lee
*Director of the United States Patent and Trademark Office*